(12) United States Patent
Quinlan et al.

(10) Patent No.: US 10,284,532 B2
(45) Date of Patent: May 7, 2019

(54) MANAGING ACCESS TO RESOURCES

(71) Applicant: BLACKBERRY LIMITED, Waterloo (CA)

(72) Inventors: Sean Michael Quinlan, Duvall, WA (US); Haniff Somani, Redwood Shores, CA (US); Alibek Jorajev, Erith (GB); Sanjiv Maurya, Fremont, CA (US); Gary Gilchrist, Millbrae, CA (US); Luis Chirinos, Dover, DE (US); Kevin Charles Lohman, Sunnyvale, CA (US); Nicholas Van Someren, Atherton, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/053,805

(22) Filed: Feb. 25, 2016

(65) Prior Publication Data

US 2017/0180335 A1    Jun. 22, 2017

Related U.S. Application Data

(60) Provisional application No. 62/199,487, filed on Jul. 31, 2015.

(51) Int. Cl.
  *H04L 9/08*   (2006.01)
  *H04L 29/06*  (2006.01)
  (Continued)

(52) U.S. Cl.
  CPC .............. *H04L 63/06* (2013.01); *H04L 9/08* (2013.01); *H04L 9/3297* (2013.01);
  (Continued)

(58) Field of Classification Search
  None
  See application file for complete search history.

(56) References Cited

U.S. PATENT DOCUMENTS 9,071,967 B1   6/2015 Davies et al.
9,654,461 B2 * 5/2017 Seibert, Jr. .......... H04L 63/0807
(Continued)

FOREIGN PATENT DOCUMENTS

EP       1585286        10/2005

OTHER PUBLICATIONS

Written Opinion of the International Preliminary Examining Authority issued in International Application No. PCT/US2016/019631 dated Jun. 30, 2017; 5 pages.
(Continued)

*Primary Examiner* — Trang T Doan
(74) *Attorney, Agent, or Firm* — Fish & Richardson P.C.

(57) ABSTRACT

Methods and systems for managing access to a resource by one of a plurality of applications. The method comprises: storing, in a first storage area associated with a first application, a first credential for use in accessing the resource; receiving, at a second application, a message comprising data for determining that the first application stores a validated credential for accessing the resource; sending a request for the validated credential from the second application to the first application; receiving the first credential at the second application from the first application in response to the request sent; and storing the first credential in a second storage area associated with the second application; wherein the message received at the second application is received from a server system, remote from the plurality of applications, which maintains data indicating a subset of the plurality of applications which store respective validated credentials for accessing the resource.

19 Claims, 14 Drawing Sheets

(51) Int. Cl.
*H04L 9/32* (2006.01)
*H04W 12/06* (2009.01)
(52) U.S. Cl.
CPC ......... *H04L 63/0428* (2013.01); *H04L 63/08* (2013.01); *H04L 63/0807* (2013.01); *H04L 63/0815* (2013.01); *H04L 63/10* (2013.01); *H04L 63/061* (2013.01); *H04W 12/06* (2013.01)

(56) References Cited

U.S. PATENT DOCUMENTS

| | | | | |
|---|---|---|---|---|
| 9,692,745 | B2* | 6/2017 | He | H04L 63/0815 |
| 2010/0146611 | A1* | 6/2010 | Kuzin | G06F 21/41 |
| | | | | 726/8 |
| 2011/0265166 | A1* | 10/2011 | Franco | G06F 21/34 |
| | | | | 726/7 |
| 2012/0151568 | A1* | 6/2012 | Pieczul | H04L 63/0815 |
| | | | | 726/8 |
| 2012/0216244 | A1* | 8/2012 | Kumar | G06F 21/31 |
| | | | | 726/1 |
| 2014/0208112 | A1 | 7/2014 | McDonald et al. | |
| 2015/0089238 | A1* | 3/2015 | Lewis | G06F 21/44 |
| | | | | 713/183 |
| 2015/0120662 | A1* | 4/2015 | Dai | G06F 17/30575 |
| | | | | 707/634 |
| 2015/0127939 | A1 | 5/2015 | Mazandarany et al. | |
| 2015/0172925 | A1* | 6/2015 | Leppanen | H04W 12/04 |
| | | | | 726/7 |
| 2015/0242609 | A1* | 8/2015 | Zheng | G06F 21/34 |
| | | | | 713/159 |
| 2015/0312256 | A1* | 10/2015 | Seibert, Jr. | H04L 63/0807 |
| | | | | 726/8 |
| 2016/0234209 | A1* | 8/2016 | Kahol | H04L 63/0869 |
| 2016/0364555 | A1* | 12/2016 | Child | G06F 21/31 |

OTHER PUBLICATIONS

Sethi et al. User Authentication on Mobile Devices. Cigital, p. 1-28.
Zhang et al. Securing Elastic Applications on Mobile Devices for Cloud Computing. CCSW'09, Nov. 13, 2009, Chicago, IL, 8 pages.
International Search Report and Written Opinion issued in International Application No. PCT/US2016/019631 dated Jun. 2, 2016.
International Preliminary Report on Patentability under Chapter II issued in International Application No. PCT/US2016/019631 dated Sep. 15, 2017; 22 pages.
Communication pursuant to Rules 161(1) and 162 EPC issued in European Application No. 16708904.4 dated Mar. 7, 2018, 3 pages.

* cited by examiner

US 10,284,532 B2

MANAGING ACCESS TO RESOURCES

CROSS REFERENCE TO RELATED APPLICATION

This application claims the benefit of U.S. provisional patent application No. 62/199,487, filed on Jul. 31, 2015, the entire content of which is incorporated herein by reference.

BACKGROUND OF THE INVENTION

Field of the Invention

The present invention relates to methods and systems for managing access to a resource from a plurality of applications running on a computing device.

Description of the Related Technology

A computing device may run one or more applications which are configured to access a resource located remote from the computing device. In some cases, access to the resource may be restricted to applications which are able to provide a valid credential for the resource in question (hereinafter termed a "resource credential"). For example, the resource may enforce access control based on a combination of username and password associated with a user account for the resource, wherein the user account is associated with a user of the computing device.

Typically, an application which requires access to the resource is configured to prompt the user to input the corresponding resource credential via a user interface, as required. Similarly, an application may cache the resource credential locally, such that the application can access the resource at a later time without re-prompting the user for the respective resource credential. Where the computing device is configured with a plurality of applications which access the same resource, each application must separately and independently prompt the user for input of the associated resource credential and cache the user-provided resource credential in local memory or storage associated with each respective application. Multiple prompts to the user in this manner may result in a poor user experience for the user of the computing device.

In the present context, the resource may be a website or a service hosted by a server which is remote from the computing device. For example, the resource may be a social networking service, a media streaming service, a document management service, a productivity suite such as Office 365™ developed by Microsoft™ of Redmond, Wash., United States of America, or a web application framework such as SharePoint™ also developed by Microsoft™ The skilled person will appreciate that there are many other such resources.

SUMMARY

A first aspect of the present disclosure provides a method of managing access to a resource by a plurality of applications, the method comprising: storing, in a first storage area associated with a first application in the plurality of applications, a first credential for accessing the resource; receiving, at a second application in the plurality of applications, a message comprising data for use in determining that the first application stores a validated credential for accessing the resource; sending a request for the validated credential from the second application to the first application based on the message; receiving the first credential at the second application from the first application in response to the request sent from the second application to the first application; and storing the first credential in a second storage area associated with the second application; wherein the message received at the second application is received from a server system, remote from the plurality of applications, which maintains data indicating a subset of the plurality of applications which store respective validated credentials for accessing the resource.

According to some embodiments, the validated credential is sent from the second application to the first application in response to a request to access to the resource received at the second application.

According to some embodiments, the second application stores a second credential and the request for a validated credential is sent from the second application to the first application in response to determining that the second credential is invalid in respect of the resource.

According to some embodiments, the method further comprises accessing the resource by the second application using the first credential received from the first application.

According to some embodiments, the method further comprises sending a notification from the first application to the server system indicating that the second application has stored the first credential.

According to some embodiments, the first storage area and the second storage area are provided by a non-volatile memory device.

According to some embodiments, the first credential comprises a secret for accessing the resource.

According to some embodiments, the first credential comprises an encrypted secret for accessing the resource.

According to some embodiments, the method further comprises decrypting the encrypted secret at the second application using a cryptographic key, wherein the cryptographic key is received at the second application from the server system.

According to some embodiments the cryptographic key is stored in volatile memory associated with the second application.

According to some embodiments the cryptographic key is received at the second application from the server system as part of an authentication session between the second application and the server system.

According to some embodiments the resource is located at a resource server remote from the plurality of applications.

According to some embodiments the resource is one of an application server, a database server, an email server, or a file server.

According to some embodiments the message received at the second application is received as part of a synchronization session between the second application and the server system.

According to some embodiments the second application comprises a first timestamp which indicates a time at which the first credential was verified as providing access to the resource by the second application.

According to some embodiments the second application stores a second credential and a second timestamp indicating a time at which the second credential was verified as providing access to the resource by the second application.

According to some embodiments the request for a validated credential is sent from the second application to the first application in response to determining that the time indicated by the first timestamp is later than the time indicated by the second timestamp.

A second aspect of the present disclosure provides a method of managing access to a resource by one of a plurality of applications, the method comprising: storing, in a first storage area associated with a first application of the plurality of applications, a first cryptographic key for decrypting a credential for use in accessing the resource; receiving, at a second application of the plurality of applications, a message comprising data for use in determining that the first application stores a validated cryptographic key for decrypting the credential sending a request for the validated cryptographic key from the second application to the first application based on the message; receiving the first cryptographic key at the second application from the first application in response to the request sent from the second application to the first application; and storing the first cryptographic key in a second storage area associated with the second application; wherein the message received at the second application is received from a server system, remote from the plurality of applications, which maintains data indicating a subset of the plurality of applications which store respective validated cryptographic keys for decrypting the credential.

According to some embodiments of the second aspect, the method further comprises decrypting an encrypted credential at the second application using the first cryptographic key, wherein the encrypted credential is received at the second application from the server system.

According to some embodiments of the second aspect, the first application is configured on a first computing device and the second application is configured on a second computing device different from the first computing device.

A third aspect of the present disclosure provides a method of managing access to a resource from a plurality of applications, the method comprising: storing data indicating a subset of the plurality of applications which store respective validated credentials for accessing the resource; receiving, at a server system remote from the plurality of applications, a notification from a first application in the plurality of applications, wherein the notification indicates that the first application has successfully accessed the resource using a first credential stored in working memory associated with the first application; updating the data based on the notification received from the first application; and sending, from the server system to a second application in the plurality of applications, data for user in determining that the first application stores a validated credential for the resource.

According to some embodiments of the third aspect, the notification received at the server system from the first application comprises data indicative of the first credential.

According to some embodiments of the third aspect, the data indicative of the first credential is a hash of the first credential, the hash of the first credential being generated by the first application.

According to some embodiments of the third aspect, the data indicating the subset of the plurality of applications which store respective validated credentials for accessing the resource includes data indicative of a second credential stored by the second application, and the method further comprises: determining, at the server system, whether the first credential is different from the second credential, based on a comparison of the data indicative of the first credential and the data indicative of the second credential; and sending, from the server system to the second application in the plurality of applications, data indicating that the second credential stored by the second application is invalid, when it is determined that the first credential is different from the second credential.

According to some embodiments of the third aspect, the first application is configured on a first computing device and the second application is configured on a second computing device different from the first computing device.

A fourth aspect of the present disclosure provides a non-transitory computer-readable storage medium comprising computer-executable instructions which, when executed by a processor, cause a computing device to perform a method of managing access to a resource by a plurality of applications, the method comprising: storing, in a first storage area associated with a first application of the plurality of applications, a first credential for accessing the resource; receiving, at a second application of the plurality of applications, a message comprising data for use in determining that the first application stores a validated credential for accessing the resource; sending a request for the validated credential from the second application to the first application based on the message; receiving the first credential at the second application from the first application in response to the request sent from the second application to the first application; and storing the first credential in a second storage area associated with the second application; wherein the message received at the second application is received from a server system remote from the computing device which maintains data indicating a subset of the plurality of applications running on the computing device which store respective validated credentials for accessing the resource.

A fifth aspect of the present disclosure provides a non-transitory computer-readable storage medium comprising computer-executable instructions which, when executed by a processor, cause a computing device to perform a method of managing access to a resource from a plurality of applications, the method comprising: storing data indicating a subset of the plurality of applications which store respective validated credentials for accessing the resource; receiving, at a server system remote from the computing device, a notification from a first application in the plurality of applications, wherein the notification indicates that the first application has successfully accessed the resource using a first credential stored in working memory associated with the first application; updating the data based on the notification received from the first application; and sending, from the server to a second application in the plurality of applications, a message comprising data for user in determining that the first application stores a validated credential for the resource.

A sixth aspect of the present disclosure provides a non-transitory computer-readable storage medium comprising computer-executable instructions which, when executed by a processor, cause a computing device to perform a method of managing access to a resource from a plurality of applications, the method comprising: storing, in a first storage area associated with a first application of the plurality of applications, a first cryptographic key for decrypting a credential for use in accessing the resource; receiving, at a second application of the plurality of applications, a message comprising data for use in determining that the first application stores a validated cryptographic key for decrypting the credential; sending a request for the validated cryptographic key from the second application to the first application based on the message; receiving the first cryptographic key at the second application from the first application in response to the request sent from the second application to the first application; and storing the first cryptographic key in a second storage area associated with the second application; wherein the message received at the second application is received from a server system, remote from the plurality of applications, which maintains data indicating a subset of the plurality of applications which store respective validated cryptographic keys for decrypting the credential.

A seventh aspect of the present disclosure provides a method of provisioning a secure container of a plurality of secure containers with a credential for use in accessing a resource from a server remote from the secure container, the method comprising: receiving, by the secure container to be provisioned, data identifying a secure container, other than said secure container to be provisioned, which has access to said credential; using said data identifying a secure container so as to transmit, by the secure container to be provisioned, a request for said credential to the secure container identified by the data; and securely storing said credential, whereby to provision said secure container.

Further features and advantages will become apparent from the following description of preferred embodiments set forth in the present disclosure, given by way of example only, which is made with reference to the accompanying drawings.

DETAILED DESCRIPTION OF CERTAIN INVENTIVE EMBODIMENTS

Figure 1:
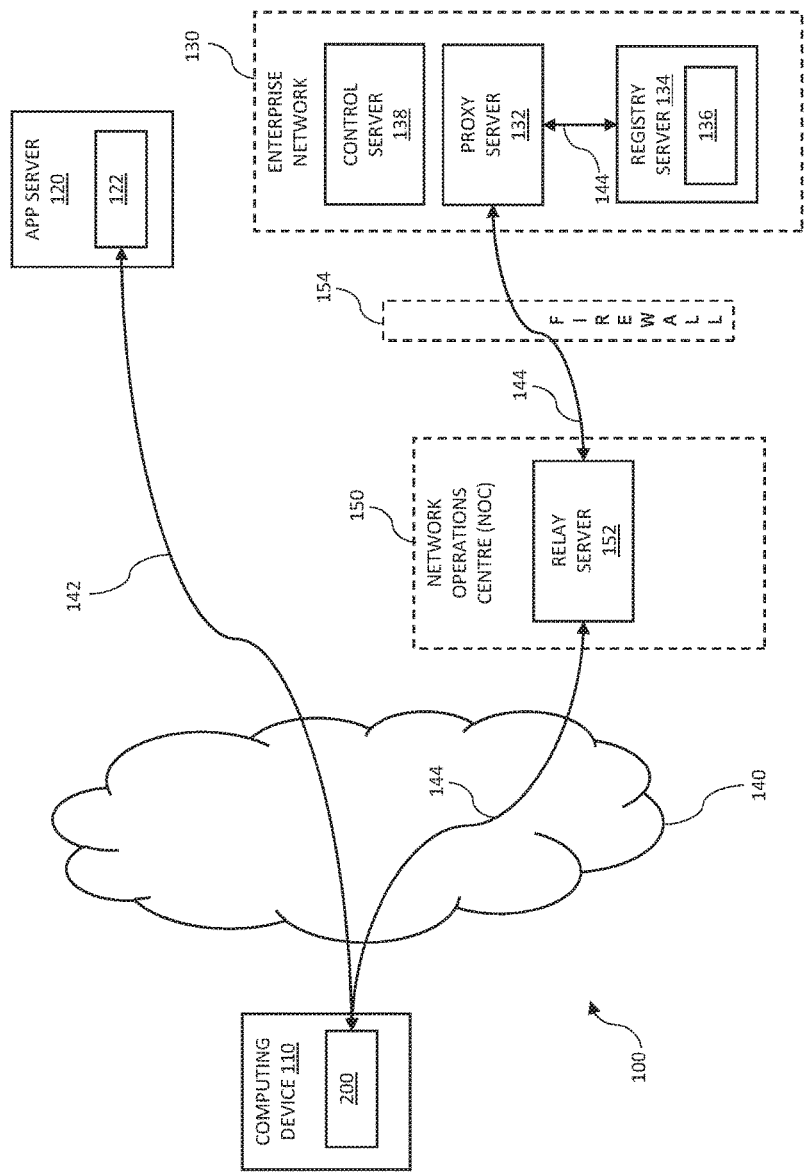
FIG. 1 is a schematic diagram showing a system for managing access to a resource in accordance with an embodiment.

FIG. 1 is a schematic diagram showing a system 100 for managing access to a resource according to an embodiment.

The system 100 includes a computing device 110 which is connected to a communications network 140. The computing device 110 may be a mobile computing device, such as a smartphone, a tablet computer, a laptop computer, or a wearable computing device such as a smartwatch or a head mounted device (e.g. Google Glass™ manufactured by Google™ Inc. of Mountain View, Calif., United States of America). The network 140 may include the Internet, a Local Area Network (LAN), a Wide Area Network (WAN), a Public Land Mobile Network (PLMN), a Public Switched Telephone Network (PSTN), or any combination thereof. The computing device 110 may access the network 140 via a cellular access network using technologies such as the Global System for Mobile Communications (GSM), Universal Mobile Telecommunications System (UMTS) and Long Term Evolution (LTE).

The computing device 110 is configured with a plurality of applications 200 which are configured to access data and services provided by servers located in an enterprise network 130. In the present example the enterprise network 130 is a private network or intranet, which includes a plurality of enterprise servers, such as a control server 138, a proxy server 132, and a registry server 134. The control server 138 provides functionality for provisioning and management of the applications 200 running on the computing device 110. Typically, the control server 138 is configured to authenticate the user of the computing device 110 prior to provisioning and activating the applications 200. Examples of application activation in this context are disclosed in PCT patent publication WO2014/120691 A1, the contents of which are incorporated herein in their entirety. Once activated, the control server 138 may provide remote management of the applications 200, such as remote locking or remote deletion of application data stored by the applications 200, in the event that the associated computing device 110 has been compromised in some way (e.g. stolen) or the user in possession of the computing device 110 is no longer associated with the enterprise.

The proxy server 132 provides the applications 200, once activated, with secure and authenticated access to the enterprise servers located in the enterprise network 130, such as the registry server 134. To access the registry server 134, a given application of the plurality of applications 200 establishes a secure communication channel 144 with the proxy server 132, which in turn provides access to the registry server 134. In the present embodiment, access to the enterprise network 130 is monitored and controlled by a Network Operations Centre (NOC) 150 which cooperates with a firewall 154 to restrict access to the enterprise network 130. In the present embodiment, the NOC 150 comprises a relay server 152 which facilitates establishment of the secure communication channel 144 between an application in the plurality of applications 200 and the proxy server 132 over the communications network 140. The secure communications channel 144 between an application and the proxy server 132 may, for example, be used to access the registry server 134 as discussed above. Authentication of the computing device 110 and/or the respective applications 200 to the NOC 150 is typically performed using a Public Key Infrastructure (PKI) or any other appropriate authentication technique known in the art. For example, authentication may be performed on the basis of the digital certificates which were provisioned to the respective applications 200 during the activation process described above.

In order to prevent unauthorized access to data held by the applications 200, each application is configured to encrypt application data stored in non-volatile memory. For example, each application may store application data in a secure "container" in non-volatile memory using cryptographic techniques known in the art, such as those specified in the Advanced Encryption Standard (AES) established by the U.S. National Institute of Standards and Technology. In this context, the secure container represents an area of secure storage configured in non-volatile memory and associated with the respective application. A secure container may adopt a plurality of states, including a locked state and an unlocked state. When in the locked state, the application data stored in the container is encrypted and cannot be accessed by the associated application. Conversely, when the container is in an unlocked state, the application data stored in the container is decrypted (i.e. plaintext) and can be accessed by the corresponding application. Typically, encryption and decryption of the container 113 is performed by the corresponding application using a cryptographic key (hereinafter termed a "container credential") which is derived from an application secret provided by the user via a user interface (hereinafter termed an "application credential"), such as a password, passcode or biometric credential. The container key may, for example, be derived from the application credential using a cryptographic hash algorithm or a hash based message authentication code (HMAC) such as the HMAC-SHA512 algorithm.

In some embodiments, the applications 200 implement a Single Sign-On (SSO) mechanism, such that the user of the computing device 110 is only required to provide the application credential to a single application which, whilst unlocked, acts as an authentication delegate to other applications in the plurality of applications 200. Communications between the applications 200 for the purposes of authentication and inter-application data transfer may be facilitated using a secure inter-application communication protocol and the plurality of applications may establish trust on the basis of the digital certificates provisioned by the control server 138 during the activation process described above. An example of authentication delegation and a suitable inter-application communication protocol is provided by the Good Dynamics™ Secure Mobility Platform developed by Good Technology Corporation™ of Sunnyvale, Calif., United States of America, aspects of which are disclosed in US patent application publications US 2013-0227279 A1, US 2013-0227287 A1 and US 2013-0227280 A1, which are hereby incorporated by reference in their entirety.

In the embodiment shown in FIG. 1, each of the applications 200 may establish a communications session 142 with an application server 120 to access a resource 122 hosted thereon. Typically, the application server 120 implements an access control mechanism (i.e. an authentication scheme) to control access to the resource 122. For example, the application server 120 may only grant access to applications 200 which present or supply a valid resource credential, such as a valid user name and password combination, associated with respective user account for the resource 122. In this example, the resource 122 is accessed using the Hypertext Transfer Protocol (HTTP) and the resource credential is associated with a protection space defined by a combination of domain (e.g. a Uniform Resource Identifiers (URI) associated with the resource) and realm (e.g. a domain-specific string associated with the resource), as defined by the Network Working Group RFC 2617, which is incorporated herein by reference in its entirety. In this context, the protection space includes the one or more resources for which access is controlled by the access control mechanism mentioned above. When an application attempts to access the resource, 122, it first initiates a communication session 142 with the application server 120 and provides a resource credential. In this example, the application 200 may provide the resource credential in response to an HTTP 401 response containing a WWW-Authenticate HTTP header received from the application server 120. In response to the HTTP 401 response from the application server 120, the requesting application 200 sends an HTTP request including the resource credential (i.e. username and password combination) in an HTTP Authorization header. In this example, the HTTP request from the application 200 containing the resource credential is typically secured using the Secure Sockets Layer (SSL) protocol (i.e. HTTPS) or similar. It will be appreciated that further embodiments may employ alternative methods for authentication of the applications 200 to the resource 122, such as the Kerberos authentication protocol, developed by the Massachusetts Institute of Technology. In this example, the resource credential shared between the applications 200 corresponds to the Kerberos ticket required to access the application server 120.

In order to minimize the number of times the user is prompted for the resource credential by the applications 200, each of the applications 200 is configured to locally store or cache the resource credential for the user, such that it can be made available to other applications in the plurality of applications 200 upon request using, for example, the inter-application communication protocol discussed above. To facilitate sharing of the resource credential between the applications 200, the registry server 134 provides a registry service 136, to which the applications send notifications regarding the status of their cached copies of the resource credential. In turn, the registry service 136 is configured to maintain a record (hereinafter termed a "location record") indicating which applications in the plurality of applications 200 store a cached copy of the resource credential, based on the notifications received from the plurality of applications 200. The applications 200 are configured to store or persist a local copy of the location record and to periodically receive updates to the location record or newer versions of the location record from the registry service 136 which are used to update the locally held copy of the location record.

When a first application in the plurality of applications 200 requires access to the resource 122, it first checks whether it has cached a local copy of the corresponding resource credential (i.e. cached in storage associated with the first application). If the resource credential is not cached locally, the first application refers to the locally stored location record to identify or determine a second application in the plurality of applications 200 which has a local cached copy of the resource credential, and sends a request for the resource credential to the second application using the inter-application communication protocol described above. In response to the request, the second application responds by retrieving the locally cached resource credential (i.e. cached in storage associated with the second application) and sending the resource credential to the first application, again using the inter-application communication protocol.

It will be appreciated that maintaining locally cached copies of the resource credential in this manner is particularly advantageous in situations where an operating system running on the computing device 110 does not provide common or shared storage for the plurality of applications 200. An example of such as operating system is the iOS operating system developed by Apple™ Inc. of Cupertino, Calif., United States of America, which places each installed application in its own "sandbox" directory and limits the application's access to files, preferences and hardware resources, etc. Moreover, maintaining locally cached copies of the resource credential avoids the need for centralized storage of resource credentials at the registry server 134 or elsewhere, thereby mitigating the risk posed by an attack by a malicious party. This latter example is particularly relevant where the registry service 136 provided by the registry server 134 is responsible for maintaining location records for resource credentials for a large number of computing devices and/or users.

In some embodiments, the applications 200 are configured to cache or store the resource credential in their respective secure containers in non-volatile memory, thereby providing application-level encryption of the resource credential. This application-level encryption ensures that the resource credential for a particular application can only be accessed while the application is running in memory and in an unlocked state. In some embodiments, an additional level of security may be desirable to prevent exposure of the resource credential in the event that the application-level security is compromised. To achieve this additional layer of security, the applications 200 may be configured to encrypt the locally cached resource credential using a cryptographic key (hereinafter termed a "credential key") based on, for example, a symmetric encryption scheme according to the Advanced Encryption Standard (AES). In such embodiments, the credential key is distributed by the registry service 136 to the applications 200, where it is stored in memory associated with the respective applications 200. For example, the credential key may be distributed to an application during an authentication session between the respective application 122 and the registry server 134. In some examples, the applications 200 may store the credential key in volatile memory such that credential key is automatically "purged" once the application has been closed or terminated, thereby mitigating the risk of the credential key being accessed by a malicious party. In these embodiments, each application 200 uses the same credential key to encrypt and decrypt the locally cached resource credentials, thereby enabling the resource credential to be passed between the applications 200 in encrypted form to provide an additional layer of protection for the resource credential whilst it is "in transit" between applications.

Figure 2:
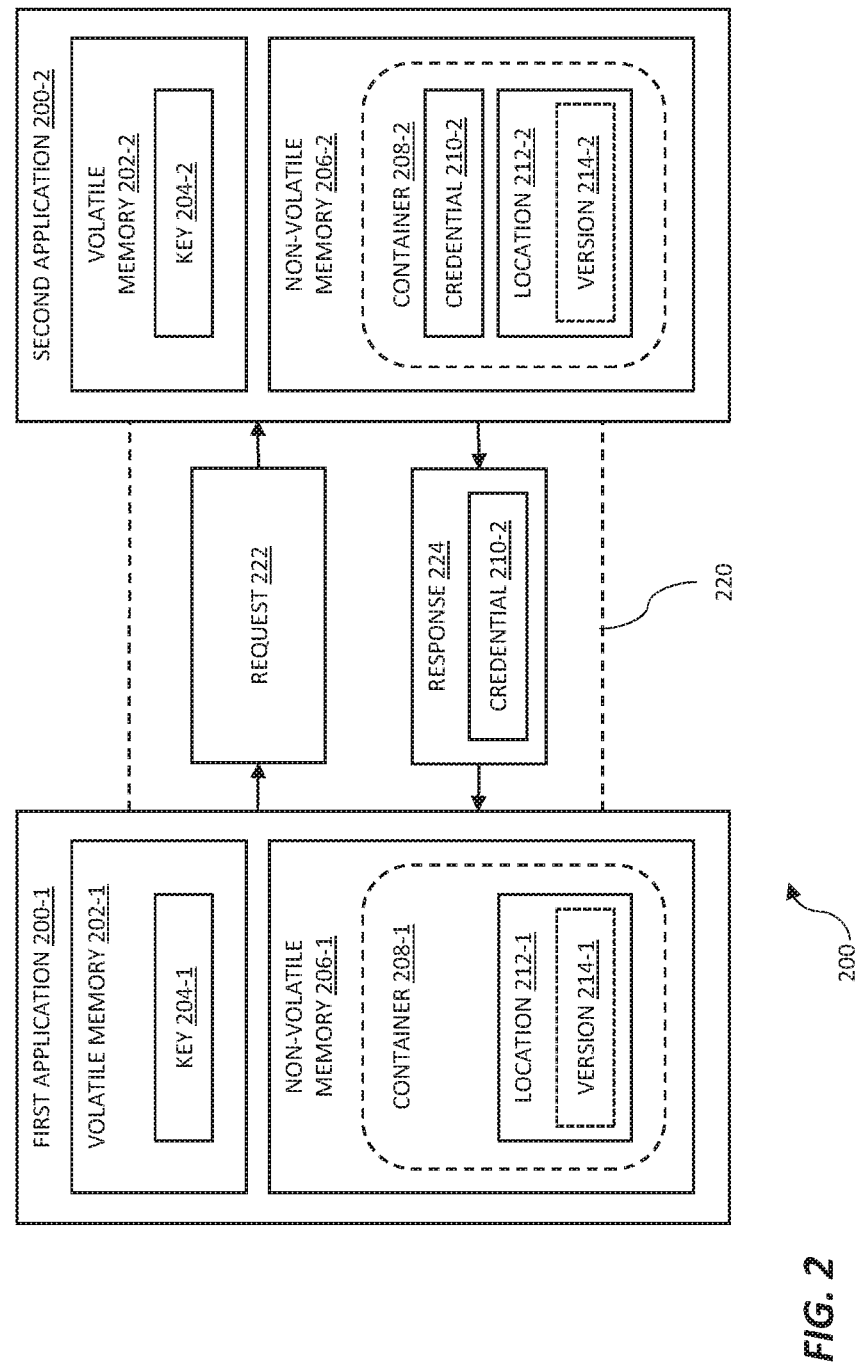
FIG. 2 is a schematic diagram showing a first application and a second application configured to access a resource in accordance with an embodiment.

FIG. 2 is a schematic diagram showing aspects of a first application 200-1 and a second application 200-2 in the plurality of applications 200 according to an embodiment. The first application 200-1 and the second applications 200-2 are associated with respective storage areas in the form of volatile memory 202-1, 202-2 (e.g. Random Access Memory (RAM) and non-volatile memory 206-1, 206-2 (e.g. a magnetic disk or a solid state storage device). The first application 200-1 and the second application 200-2 each store a credential key 204-1, 204-2 in their respective areas of volatile memory 202-1, 202-2. Similarly, the first application 200-1 and the second application 200-2 also store respective credential location records 212-1, 212-2 in respective secure containers 208-1, 208-2, located in non-volatile memory 206-1, 206-2. As discussed above with reference to FIG. 1, the local location records 212-1, 212-2 indicate which applications in the plurality of applications 200 store a cached copy of the resource credential based on notifications received at the registry service 136. According to some embodiments, the local location records 212-1, 212-2 may also include corresponding version information 214-1, 214-2, which provides a relative indication of the age of the location record 212-1, 212-2. The version information 214-1, 214-2 may, for example, be a version number assigned to the respective location record 212-1, 212-2 by the registry service 136, or a version time indicating a time at which the respective location record was generated or updated by the registry service 136.

With reference to the embodiment shown in FIG. 2, in a particular example the second application 200-2 stores a resource credential 210-2 for the resource 122, which has been encrypted using credential key 204-2, in its respective secure container 208-2. In contrast, the first application 200-1 does not initially store or cache a copy of the user's resource credential for the resource 122. As discussed above with reference to FIG. 1, the first application 200-1 and the second application 200-2 are configured to communicate with each other using an inter-application communication protocol 220. Accordingly, when the first application 200-1 requires access to the resource 122, it accesses its respective location record 212-1 to determine which of the plurality of application 200 has a locally cached copy of the resource credential. In this case, the location record 212-1 indicates that the second application 200-2 has a cached copy of the resource credential for the resource 122, and the first application 200-1 proceeds to send a request for the resource credential 210-2 to the second application 200-2 using the inter-application communication protocol 220, in the form of request message 222. Upon receipt of the request message 222, the second application 200-2 retrieves the encrypted resource credential 210-2 from its respective secure container 208-2 and returns the encrypted resource credential 210-2 to the first application 200-1 using the inter-application communication protocol 220, in the form of a response message 224. Upon receipt of the response message 224, the first application 200-1 stores the encrypted resource credential 210-2 in its respective secure container 208-1, decrypts the encrypted resource credential 210-2 using credential key 204-1, and accesses the resource 122 using the decrypted resource credential.

Figure 3:
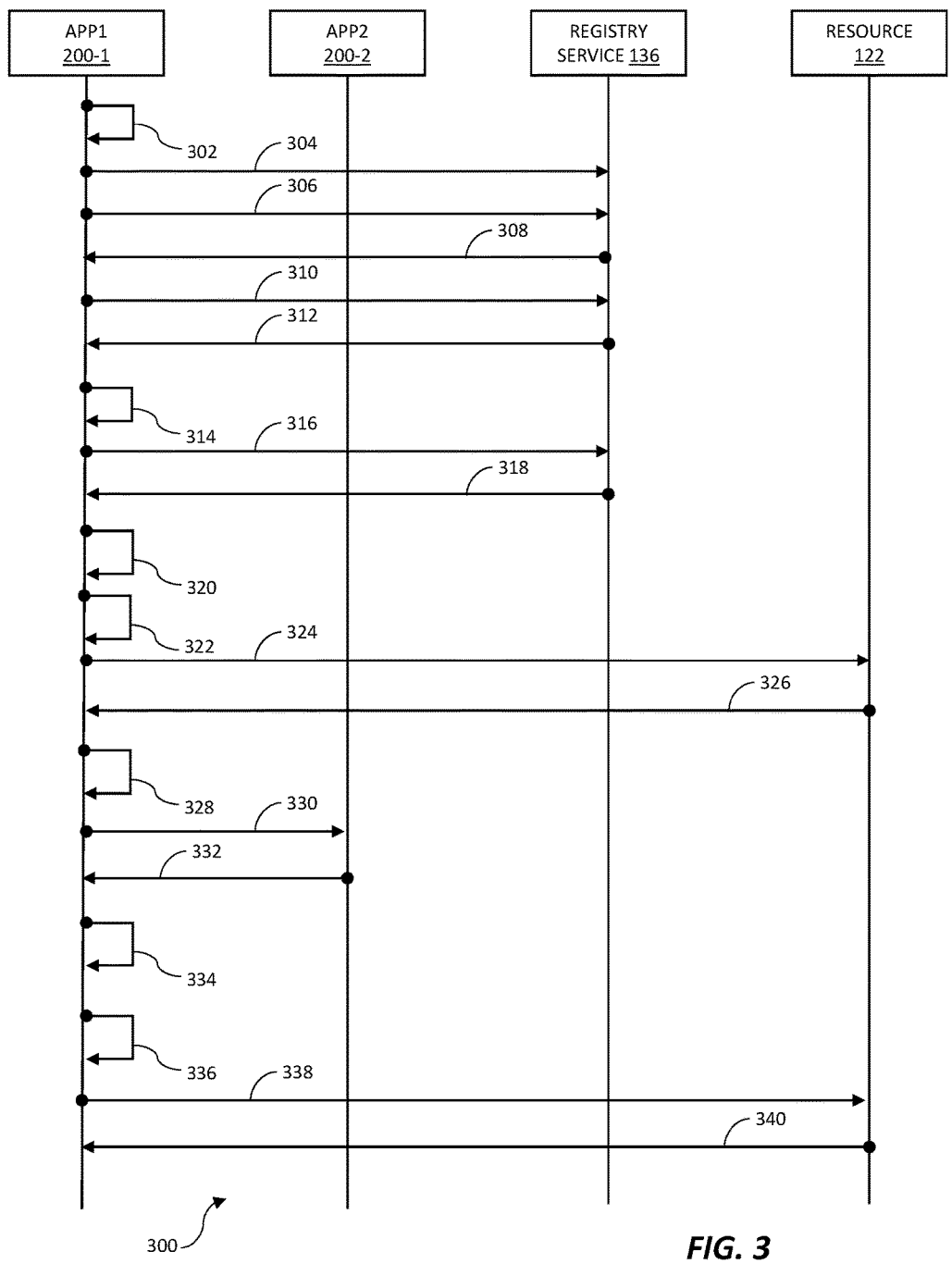
FIG. 3 is a signaling diagram showing a method of accessing a resource in accordance with an embodiment.

FIG. 3 is a signaling diagram showing the steps involved in accessing the resource 122 in accordance with an embodiment. In a first step, the first application 200-1 connects to the NOC 150 and authenticates itself in the usual manner to gain access to the enterprise network 130 [step 302]. Once authenticated, the first application 200-1 sends a subscription request to the registry service 136 hosted on the registry server 134 to subscribe to updates to the location record held by the registry server 134 and the credential key for the computing device 110 [step 304]. Thereafter, the first application 200-1 may send a request for the current version (i.e. most up-to-date version) of the location record for the computing device 110 to the registry service 136 [step 306], in response to which the registry service 136 returns the version information corresponding to the location record [step 308]. Next, the first application 200-1 requests the credential key for the resource 122 from the registry service 136 [step 310] and the registry service 136 responds by sending the current credential key to the first application 200-1 [step 312]. It will be appreciated that in some embodiments the requests from the first application 200-1 to the registry service 136 at steps 304, 306 & 310 may be pipelined into a single request, as may the associated responses from the registry service 136 to the first application 200-1 at steps 308 & 312. The skilled person will also appreciate that, while steps 306 and 308 occur after step 304, they can occur at a point in time other than, for example, in response to execution of step 304.

Next, the first application 200-1 determines whether the associated location record 212-1 stored locally by the first application 200-1 is the current version, based on the version information provided by the registry service 136 at step 308 [step 314]. If the stored location record 212-1 is not the current version, the first application 200-1 sends a request for the current version of the location record to the registry service 136 [step 316]. The registry service 136 responds by sending the current version of the credential location record to the first application 200-1 [step 318] and the first application 200-1 stores the credential location record in its secure container 208-1 [step 320].

The first application 200-1 then receives a request to access the resource 122 hosted by the application server 120 [step 322]. For example, the first application 200-1 may receive the request via a user interface associated with the first application 200-1. In response to the request to access the resource 122, the first application 200-1 sends a request to the resource 122 [step 324]. In this example, access to the resource 122 is restricted by the application server 120, which responds to the request at step 324 by returning an authentication request to the first application 200-1 [step 326]. In response to the authentication request, the first application 200-1 accesses the locally stored location record 212-1 and determines which of the plurality of applications 200 stores a cached copy of the resource credential associated with the resource [step 328]. In the present example, the location record 212-1 indicates that the second application 200-2 stores a cached copy of the resource credential and the first application 200-1 proceeds to send a request message 222 identifying the resource 122 to the second application 200-2 using the inter-application communication protocol 220 [step 330]. The second application 200-2 responds by returning the encrypted resource credential 210-2 to the first application 200-1 in a response message 224 which is delivered using the inter-application communication protocol 220 [step 332]. Upon receipt of the response message 224, the first application 200-1 extracts the encrypted credential 210-2 and stores the encrypted credential 210-2 in the respective secure container 208-1 [step 334]. Next, the first application 200-1 decrypts the encrypted credential 210-2 using credential key 204-1 [step 336] and proceeds to respond to the authentication request received at step 326 by sending the resource credential to the resource 122 [step 338]. Upon receipt of the resource credential, the application server 120 validates the credential in the normal manner and notifies the first application 200-1 that access to the resource 122 has been granted [step 336].

Figure 4:
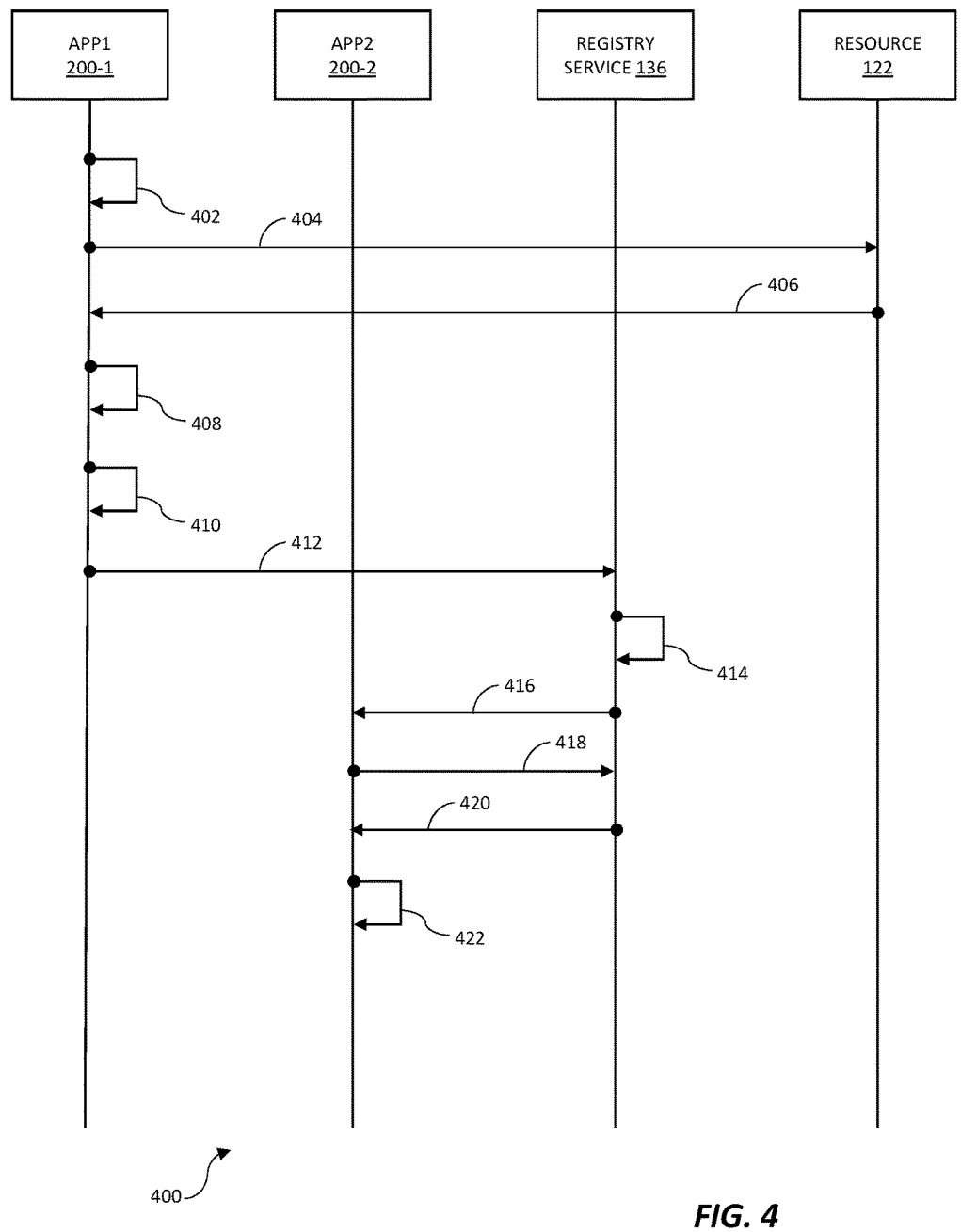
FIG. 4 is a signaling diagram showing a method of updating a resource credential in accordance with an embodiment.

FIG. 4 is a signaling diagram showing a method 400 of updating the location records persisted at the plurality of applications 200 in accordance with an embodiment. In the embodiment illustrated in FIG. 4, the first application 200-1 does not initially store a locally cached copy of the resource credential (or stores an invalid or old credential for the resource 122) and the locally cached location record 208-1 for the resource 122 indicates that none of the other applications 200 store a cached copy of the resource credential. In this situation, the first application 200-1 prompts the user for the resource credential and receives the resource credential via a user interface [step 402]. Next, the first application 200-1 requests access to the resource 122 and provides the resource credential for authentication [step 404]. The application server 120 checks the resource credential provided by the first application 200-1 and, if valid, responds appropriately to the first application 200-1 [step 406]. Upon successfully accessing the resource 122, the first application 200-1 encrypts the resource credential using its locally cached credential key 204-1 [step 408], and stores the encrypted resource credential in its secure container 208-1 [step 410]. Next, the first application 200-1 sends a message to the registry service 136 to notify the registry service that it the first application 200-1 is in possession of a valid resource credential [step 412]. In this example, the message includes the data identifying the resource (e.g. domain and realm for the resource), the data identifying the first application 200-1, and the date and time at which the credential was validated (e.g. a timestamp).

Upon receipt of the message from the first application 200-1, the registry service 136 creates a new location record or updates an existing location record for the resource 122 to indicate that the first application 200-1 is in possession of a recently validated resource credential [step 414]. Next, the registry service 136 sends a notification to applications 200 on the computing device 110 which have subscribed to receive location record updates (e.g. step 304 of FIG. 3), which in this case includes the second application 200-2 [step 416]. Upon receipt of the notification, the second application 200-2 may request the updated location record for the resource 122 from the registry service 136 [step 418], causing the registry service 136 to respond by sending the updated location record to the second application 200-2 [step 420]. Finally, the second application 200-2 may store the updated location record in its secure container 208-2 [step 422].

In some circumstances, the registry service 136 may not hold a credential key for resource 122. In this case, the registry service 136 responds to the request from the first application 200-1 at step at step 312 of FIG. 3 by informing the first application 200-1 that there is currently no credential key stored for the particular resource and user. In this case, the first application 200-1 generates a new credential key and sends the new credential key to the registry service 136 for distribution to other applications 200 [step 316]. Alternatively, the new credential key may be generated by the registry service 122 itself and returned to the first application 200-1 at step 312. It will be appreciated that generation of a new credential key, either by an application 200 or by the registry service 122, typically renders the credential keys previously stored by the applications 200 invalid with respect to resource credentials which are encrypted using the new credential key. This characteristic enables an administrator to essentially render invalid the encrypted credentials cached by the applications 200 by deleting or replacing the credential key stored by the registry service 122. In some cases, the credential key may persist in volatile memory at in one or more of the applications 200 at the computing device 110 after the credential key has been deleted or replaced by the registry service 122. Although any risk posed by this persistence is mitigated by application lock mechanisms described above, in some embodiments the applications 200 may be configured to erase or delete such cached credential keys stored in volatile memory in response to an erase command from an enterprise server, such as the control server 138.

Figure 5:
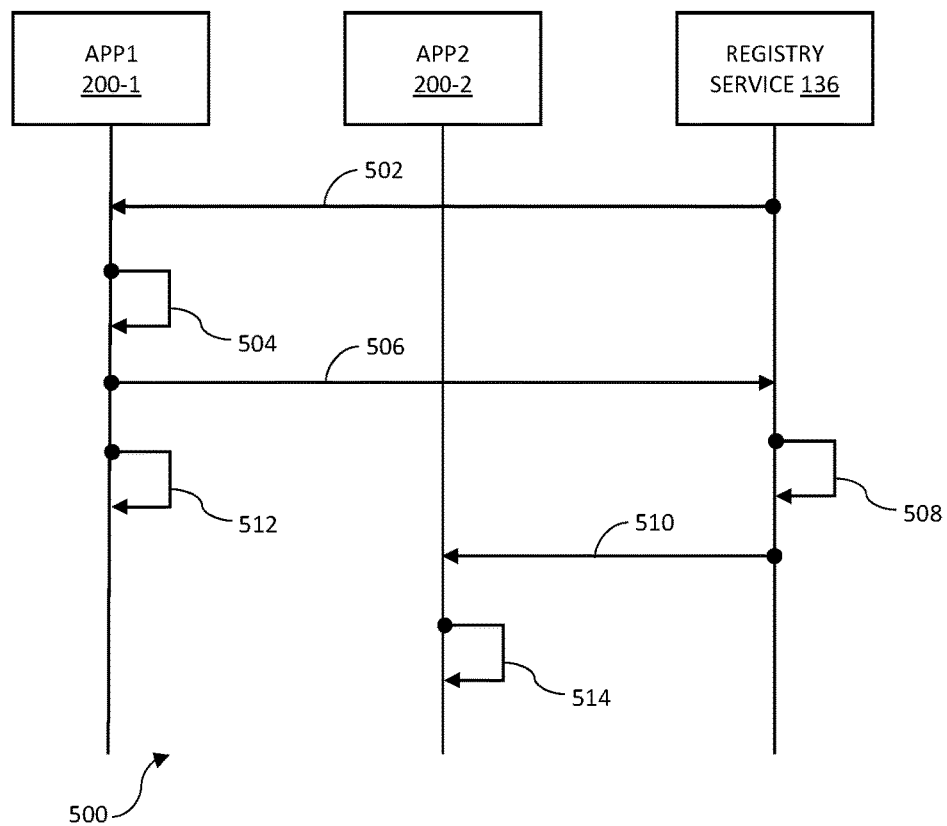
FIG. 5 is a signaling diagram showing a method of updating a credential key in accordance with an embodiment.

In some embodiments, the credential key issued to the applications 200 may be "rotated" or changed on a periodic basis or in response to a command issued by a remote server, such as the registry server 134. FIG. 5 is a signaling diagram showing an embodiment of a method 500 for rotating the credential key for the plurality of applications 200 in this manner. In this embodiment, the first application 200-1 receives a key rotation command from the registry server 134 [step 502] and, in response to the command, the first application 200-1 generates a new credential key using, for example, the key generation techniques described above [step 504]. Next, the first application 200-1 sends the new credential key to the registry service 136 [step 506] and the registry service 136 stores the new credential key for subsequent distribution to other applications in the plurality of applications 200 [step 508]. Next, the registry service 136 sends the new credential key to other applications in the plurality of applications 200 on the computing device 110 which have subscribed to receive credential key updates, including the second application 200-2 [step 510] and, upon receipt, the second application 200-2 stores the new credential key in volatile memory.

Figure 6:
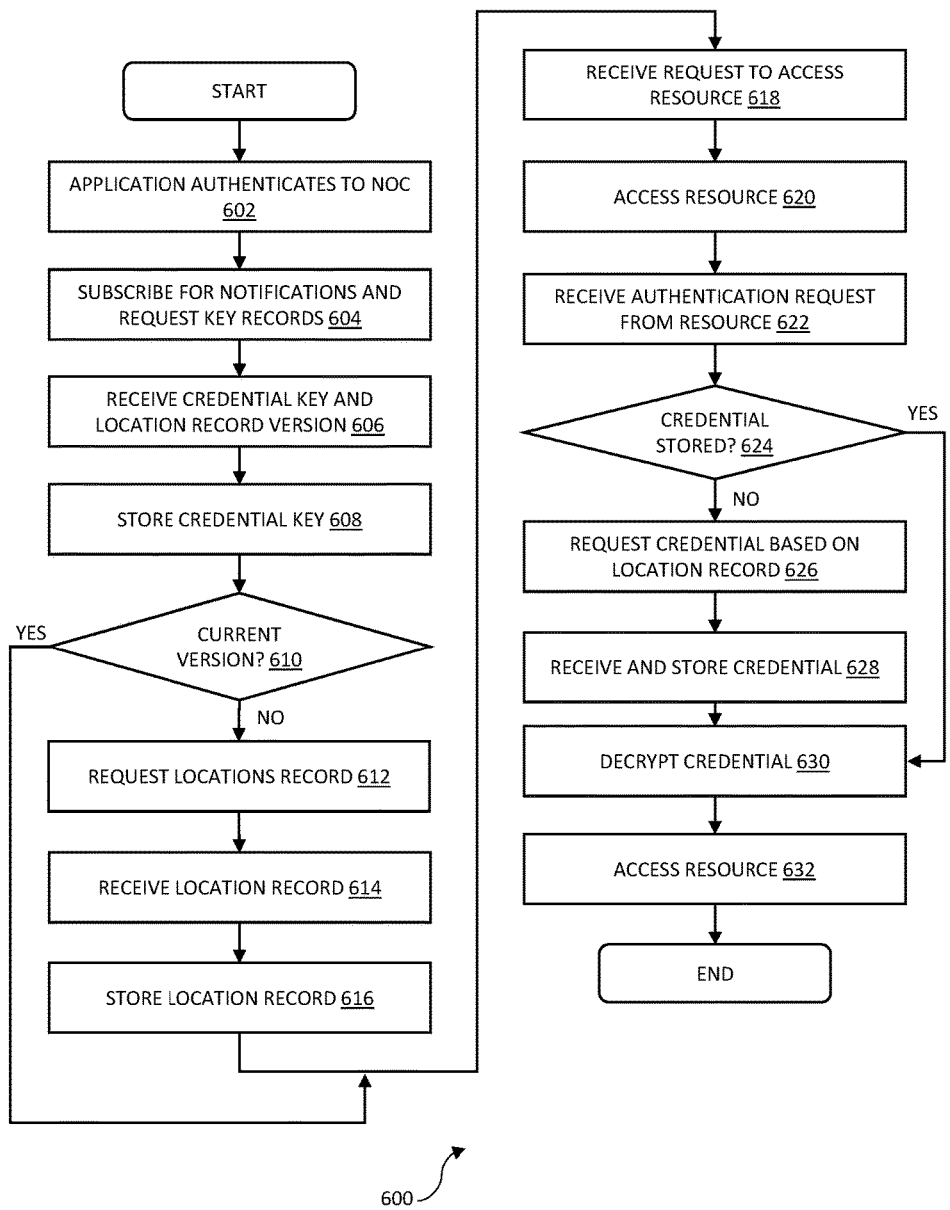
FIG. 6 is a flow chart showing a method of accessing a resource from the perspective of an application running on a computing device in accordance with an embodiment.

FIG. 6 is a flow chart showing a method 600 of accessing a resource from the perspective of the first application 200-1, in accordance with the embodiment described above with reference to FIG. 3. First, the first application 200-1 authenticates to the NOC 150 [step 602] and subscribes to updates to the credential key and credential location records managed by the registry service 136 [step 604]. Next, the first application 200-1 receives the credential key and version information for the corresponding location record from the registry service 136 [step 606] and stores the credential key in volatile memory 202-1 [step 608]. The first application 200-1 compares the version information received from the registry service 136 with version information 214-1 previously received from the registry server 136 to determine whether the currently stored location record 212-1 is the most recent version of the location record stored by the registry service 122 [step 610]. If the location record 212-1 currently stored by the first application 200-1 is not the most recent version, the first application 200-1 sends a request for the location record to the registry service 136 [step 612], receives the location record [step 614] and stores the received location record in non-volatile memory 206-1 [step 616]. Next, the first application 200-1 receives a request to access the resource 122 (e.g. via a user interface) [step 618] and, in response to the request, the first application 200-1 attempts to access the resource 122 hosted at the application server 120 [step 620]. The application server 120 responds by sending an authentication request to the first application 200-1 [step 622], in response to which the first application 200-1 determines whether a corresponding resource credential is stored in its respective non-volatile memory 206-1 [step 624]. If a corresponding resource credential is not stored by the first application 200-1, the first application 200-1 proceeds to retrieve the location record 212-1 from non-volatile memory 206-1 and determines whether one of the applications 200 stores a cached copy of a resource credential for resource 122. In this case, the first application 200-1 determines that the second application 200-2 stores a copy of the resource credential, so the first application 200-1 sends a request 222 for the resource credential to the second application 200-2 using the inter-application communication protocol 220 [step 626]. Next, the first application 200-1 receives a response 224 containing the resource credential 210-2 from the second application 200-2 and it proceeds to store the resource credential 210-2 in non-volatile memory 206-1 [step 628]. In this case, the resource credential is encrypted using the credential key 204-1 received from the registry server 122 at step 606, so the first application 200-1 decrypts the resource credential 210-2 using the credential key 204-1 [step 630] and sends the decrypted resource credential to the application server 120 to gain access to the resource 122 [step 632].

Figure 7:
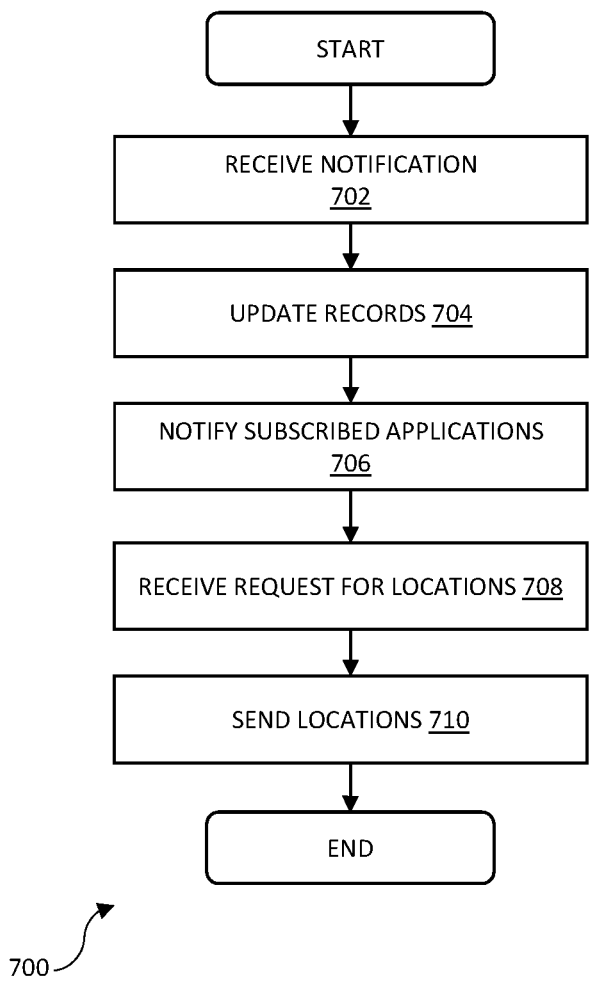
FIG. 7 is a flow chart showing a method of updating a resource credential at a control server in accordance with an embodiment.

FIG. 7 is a flow chart showing a method of updating a resource credential at the registry service 136 in accordance with the embodiment described above with reference to FIG. 4. In a first step, the registry service 136 receives a notification from the first application 200-1 indicating that the first application 200-1 stores a cached copy of a valid resource credential for the resource 122 [step 702]. Next, the registry service 136 updates the location record to reflect that first application 200-1 stores a cached copy of the resource credential [step 704]. Once the location record has been updated, the registry service 136 determines which of the applications 200 running on the computing device 110 have subscribed for updates to the location record and proceeds to send notifications to the subscribed applications to notify them of the updated location record [step 706]. In the present example, the second application 200-2 has subscribed to receive updates to the location record for the resource, so the registry service 122 sends a notification to the second application 200-2 at step 706. Next, upon receipt of the notification, the second application 200-2 requests the updated location record for the resource 122 from the registry service 136 [step 708] and the registry service 136 responds by sending the updated location record to the second application 200-2 [step 710]

According to further embodiments, the applications 200 may be configured to store resource credentials for a plurality of resources, together with respective location records. Moreover, the location records for a plurality of resources may be combined or stored as a single consolidated location record. In a similar manner, the applications 200 may be configured to store more separate credential keys for each of a plurality of resources, such that access to the respective resource credentials may be controlled on a per-resource basis. In other words, the credential key for a given resource may be distributed to only a subset of the plurality of applications 200, thus providing an additional level of control over which of the applications can access the given resource. It will also be appreciated that the plurality of resources may be hosted on one or more separate application servers. Moreover, according to some embodiments, one or more of the application servers may be located in the enterprise network 130, this requiring authentication of the requesting application 200 by the NOC 150 before the respective resource can been accessed.

Further embodiments may be considered as methods of provisioning a secure container with a credential key for accessing a remote resource. For example, a method of provisioning a secure container of a plurality of secure containers with a credential for use in accessing a resource from a server remote from the secure container may comprise receiving, by the secure container to be provisioned, data identifying a secure container, other than said secure container to be provisioned, which has access to the credential. Using the data identifying a secure container, the secure container to be provisioned transmits a request for said credential to the secure container identified by the data. Upon receipt of the credential, the secure container securely stores the credential, thereby provisioning the secure container. In this manner, the secure container to be provisioned may obtain an appropriate credential for use in accessing the resource without prompting a user for input. In such embodiments, the remote server is configured to maintain a location record specifying which of the plurality of containers is provisioned with the credential, such that the data identifying the secure container which has access to the credential can be correctly configured before being transmitted to the secure container to be provisioned. As discussed above with reference to FIGS. 1 to 7, this location record may be updated based on periodic updates received from the plurality of secure containers. It will be appreciated that, by storing the credential locally in the plurality of secure containers, it is possible to avoid storage of the credential at the remote server, thereby mitigating the risk of the credential being compromised by an attack on the remote server. This aspect is particularly advantageous where, for example, the remote server maintains location records for a plurality of credentials which may be associated with a plurality of respective users or computing devices.

According to some embodiments the first application 200-1 and the second application 200-2 of FIG. 2 may be installed on separate computing devices which are communicatively coupled to enable communications between the respective applications 200-1, 200-2. For example, the first application 200-1 may be running on a mobile device and the second application 200-2 may be running on a wearable device which can be communicatively coupled or "paired" with the mobile device.

According to these embodiments, communications between the first and second applications 200-1, 200-2 for the purpose of sharing the credential key requires that the first and second applications 200-1, 200-2 are operable to notify each other and other applications in the plurality of applications 200 that they are available for credential key sharing. Such notifications may be facilitated using a service discovery protocol, implemented using mechanisms such as those disclosed in international patent publications WO2014/014879 A2 and WO 2015/089318 A2, published under the Patent Cooperation Treaty, which are hereby incorporated by reference in their entirety.

Figure 8:
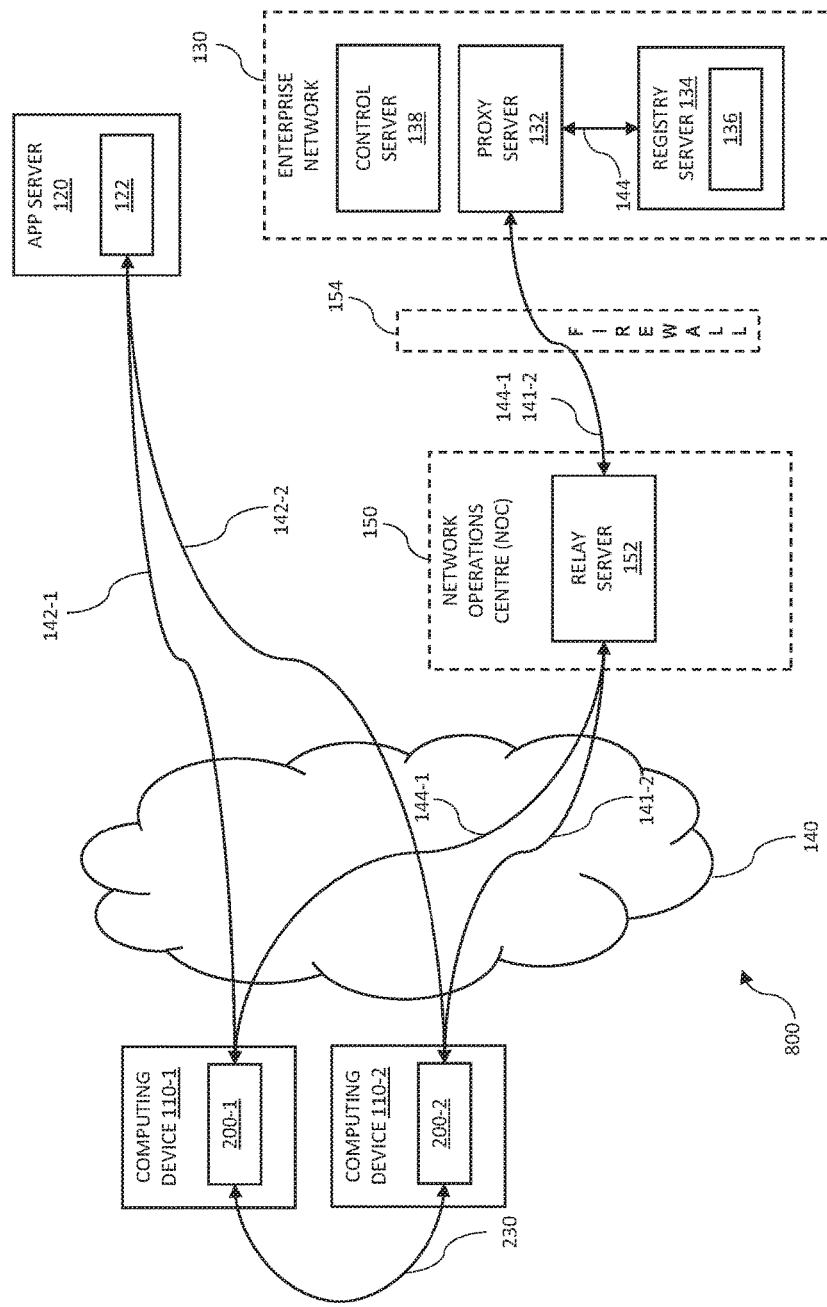
FIG. 8 is a schematic diagram showing a system for managing access to a resource from a plurality of devices in accordance with an embodiment.

A system 800 for credential sharing between applications 200 installed on different computing devices 110 is shown schematically in FIG. 8. In this context, system 800 of FIG. 8 is similar to system of 100 of FIG. 1 described above, and components common to both figures are denoted using the same reference numerals for clarity.

The system 800 of FIG. 8 includes a first computing device 110-1 and a second computing device 110-2, which are both connected to a communications network 140. Typically, but not exclusively the first and second computing devices 110-1, 110-2 are associated with the same user or entity. The first and second computing devices 110-1, 110-2 may be mobile computing devices, such as smartphones, tablet computers, laptop computers, or wearable computing devices such as smartwatches or head mounted devices (e.g. Google Glass™ manufactured by Google™ Inc. of Mountain View, Calif., United States of America). The network 140 may include the Internet, a Local Area Network (LAN), a Wide Area Network (WAN), a Public Land Mobile Network (PLMN), a Public Switched Telephone Network (PSTN), or any combination thereof. The first and second computing devices 110-1, 110-2 may access the network 140 via a cellular access network using technologies such as the Global System for Mobile Communications (GSM), Universal Mobile Telecommunications System (UMTS) and Long Term Evolution (LTE).

The first and second computing devices 110-1, 110-2 are configured with respective applications 200-1, 200-2, which in turn are configured to access data and services provided by servers located in an enterprise network 130. The enterprise network 130 is a private network or intranet, which includes a plurality of enterprise servers, such as a control server 138, a proxy server 132, and a registry server 134. The control server 138 provides functionality for provisioning and management of the first and second applications 200-1, 200-2 running on the first and second computing devices 110-1, 110-2 respectively. Typically, the control server 138 is configured to authenticate the user of the computing devices 110-1, 110-2 prior to provisioning and activating the applications 200-1, 200-2. Examples of application activation in this context are disclosed in PCT patent publication WO 2014/120691 A1, the contents of which are incorporated herein in their entirety. Once activated, the control server 138 may provide remote management of the applications 200-1, 200-2, such as remote locking or remote deletion of application data stored by the applications 200-1, 200-2, in the event that the respective computing device 110-1, 100-2 has been compromised in some way (e.g. stolen) or the user in possession of the respective computing device 110-1, 110-2 is no longer authorized to access the enterprise network.

The proxy server 132 provides the applications 200-1, 200-2, once activated, with secure and authenticated access to the enterprise servers located in the enterprise network 130, such as the registry server 134. To access the registry server 134, the given application 200-1, 200-2 establishes a secure communication channel 144-1, 144-2 with the proxy server 132, which in turn provides access to the registry server 134. In the present embodiment, access to the enterprise network 130 is monitored and controlled by a Network Operations Centre (NOC) 150, which cooperates with a firewall 154 to restrict access to the enterprise network 130. According to system 800, the NOC 150 comprises a relay server 152 which facilitates establishment of the secure communication channels 144-1, 144-2 between the first and second applications 200-1, 200-2 and the proxy server 132 over the communications network 140. The secure communications channels 144-1, 144-2 between the first and second applications 200-1, 200-2 and the proxy server 132 may, for example, be used to access the registry server 134 as discussed above. Authentication of the computing devices 110-1, 100-2 and/or the respective applications 200-1, 200-2 by the NOC 150 is typically performed using a Public Key Infrastructure or any other appropriate authentication technique known in the art. For example, authentication may be performed on the basis of one or more digital certificates which are provisioned to the first and second applications 200-1, 200-2 during the activation process described above.

In order to prevent unauthorized access to data held by the first and second applications 200-1, 200-2, each application is configured to encrypt application data stored in non-volatile memory. For example, each application may store application data in a secure "container" in non-volatile memory using cryptographic techniques known in the art, such as those specified in the Advanced Encryption Standard (AES) established by the U.S. National Institute of Standards and Technology. In this context, the secure container represents an area of secure storage configured in non-volatile memory and associated with the respective application. A secure container may adopt a plurality of states, including a locked state and an unlocked state. When in the locked state, the application data stored in the container is encrypted and cannot be accessed by the associated application. Conversely, when the container is in an unlocked state, the application data stored in the container is decrypted (i.e. plaintext) and can be accessed by the corresponding application. Typically, encryption and decryption of the container 113 is performed by the corresponding application using a cryptographic key (hereinafter termed a "container credential") which is derived from an application secret provided by the user via a user interface (hereinafter termed an "application credential"), such as a password, passcode or biometric credential. The container key may, for example, be derived from the application credential using a cryptographic hash algorithm or a hash based message authentication code (HMAC) such as the HMAC-SHA512 algorithm.

In some embodiments, the first and second applications 200-1, 200-2 each implement a service discovery protocol which enables automatic detection of services offered by the applications 200-1, 200-2 on the respective devices. In this manner, the first application 200-1 running on the first computing device 110-1 is able to detect that the second application 200-2 running on the second device 110-2 is available for resource credential sharing, and vice versa. As discussed above, the service discovery protocol may be implemented using the mechanisms discussed in international patent publications WO 2014/014879 A2 and WO 2015/089318 A2, published under the Patent Cooperation Treaty. According to such embodiments, the first and second applications 200-1, 200-2 may be configured to establish direct device-to-device communications channel 230 using a technology such as Bluetooth™, NFC, Wi-Fi Direct™, Infrared (e.g. IrDA™), or the proposed device-to-device (D2D) protocols for the Long Term Evolution (LTE) mobile communications standard. Similarly, a direct device-to-device communications channel may be established using an ad-hoc wireless network based on the Institute of Electrical and Electronics Engineers (IEEE) 802.11 standards (Wi-Fi™). Moreover, according to some embodiments, the device-to-device communication channel 230 between the first application 200-1 and the second application 200-2 may be facilitated by an intermediate server (e.g. a server located in the NOC 150), to which each of applications 200-1, 200-2 may have a persistent connection. In this manner, problems associated with Network Address Translation (NAT) can be circumvented by using the persistent connections to establish the device-to-device communication channel.

Secure communications between the first and second applications 200-1, 200-2 over the device-to-device communications channel 230 may be facilitated using a secure inter-application communication protocol and the plurality of applications may establish trust on the basis of the digital certificates provisioned by the control server 138 during the activation process described above. An example of a suitable inter-application communication protocol is provided by the Good Dynamics™ Secure Mobility Platform developed by Good Technology Corporation™ of Sunnyvale, Calif., United States of America, aspects of which are disclosed in US patent application publications US 2013-0227279 A1, US 2013-0227287 A1 and US 2013-0227280 A1, which are hereby incorporated by reference in their entirety.

In the embodiment shown in FIG. 8, the first and second applications 200-1, 200-2 may establish respective communications sessions 142-1, 142-2 with an application server 120 to access a resource 122 hosted thereon. Typically, the application server 120 implements an access control mechanism (i.e. an authentication scheme) to control access to the resource 122. For example, the application server 120 may only grant access to applications which present or supply a valid resource credential, such as a valid user name and password combination, associated with respective user account for the resource 122. In this example, the resource 122 is accessed using the Hypertext Transfer Protocol (HTTP) and the resource credential is associated with a protection space defined by a combination of domain (e.g. a Uniform Resource Identifiers (URI) associated with the resource) and realm (e.g. a domain-specific string associated with the resource), as defined by the Network Working Group RFC 2617, which is incorporated herein by reference in its entirety. In this context, the protection space includes the one or more resources for which access is controlled by the access control mechanism mentioned above. When one of the first and second application 200-1, 200-2 attempts to access the resource, 122, it first initiates a respective communication session 142-1, 142-2 with the application server 120 and provides a resource credential. In this example, the first or second application 200-1, 200-2 may provide the resource credential in response to an HTTP 401 response containing a WWW-Authenticate HTTP header received from the application server 120. In response to the HTTP 401 response from the application server 120, the requesting application 200-1, 200-2 sends an HTTP request including the resource credential (i.e. username and password combination) in an HTTP Authorization header. In this example, the HTTP requests from the application 200-1, 200-2 containing the resource credential is typically secured using the Secure Sockets Layer (SSL) protocol (i.e. HTTPS) or similar. It will be appreciated that further embodiments may employ alternative methods for authentication of the applications 200 to the resource 122, such as the Kerberos authentication protocol, developed by the Massachusetts Institute of Technology. In this example, the resource credential shared between the first and second applications 200-1, 200-2 corresponds to the Kerberos ticket required to access the application server 120.

In order to minimize the number of times the user of the first and second computing devices 110-1, 110-2 is prompted to input the resource credential, the first and second applications 200-1, 200-2 are configured to locally store or cache the resource credential for the user, such that it can be made available to other respective application 200-1, 200-2 upon request using, for example, the service discovery and inter-application communication protocols discussed above. To facilitate sharing of the resource credential between the first and second applications 200-1, 200-2, the registry server 134 provides a registry service 136, to which the first and second applications 200-1, 200-2 send notifications regarding the status of their cached copies of the resource credential. In turn, the registry service 136 is configured to maintain a record (hereinafter termed a "location record") indicating which of the applications 200-1, 200-2 stores a cached copy of the resource credential, and the computing device 110-1, 110-2 on which the particular application 200-1, 200-2 is installed. Thus, the location record stores information which enables the first and second applications 200-1, 200-2 to determine which application stores a cached copy of the resource credential, and the computing device 110-1, 110-2 on which the indicated application is running. The location record may be maintained on the basis of notifications received from the first and second applications 200-1, 200-2. The first and second applications 200-1, 200-2 are configured to store or persist a local copy of the location record for the resource and to periodically receive updates to the location record or newer versions of the location record from the registry service 136 which are used to update the locally held copy of the location record.

In a typical example, when the first application 200-1 running on the first computing device 110-1 requires access to the resource 122, it first checks whether it has cached a local copy of the corresponding resource credential (i.e. cached in storage associated with the first application 200-1). If the resource credential is not cached locally, the first application 200-1 refers to the locally stored location record and determines whether the resource credential can be obtained from a different application associated with the user which has a local cached copy of the resource credential. For example, the first application 200-1 may determine that the second application 200-2 on the second computing device 110-2 has a locally cached copy of the resource credential. Next, the first application 200-1 on the first computing device 110-1 determines whether the second application 200-2 on the second computing device is available using the service discovery protocol, as discussed above. If the second application 200-2 is available for credential sharing, the first application 200-1 sends a request for the resource credential to the second application 200-2 using the inter-application communication protocol described above. In response to the request, the second application 200-2 responds by retrieving the locally cached resource credential (i.e. cached in storage associated with the second application) and sending the resource credential to the first application 200-1, again using the inter-application communication protocol.

It will be appreciated that maintaining locally cached copies of the resource credential in this manner is particularly advantageous in situations where the first and second applications running on the first and second computing devices 110-1, 110-2 do not have access to common or shared storage. Moreover, maintaining locally cached copies of the resource credential avoids the needs for centralized storage of resource credentials at the registry server 134 or elsewhere, thereby mitigating the risk posed by an attack by a malicious party. This latter example is particularly relevant where the registry service 136 provided by the registry server 134 is responsible for maintaining location records for resource credentials for a large number of computing devices, resources and/or users.

In some embodiments, the first and second applications 200-1, 200-2 are configured to cache or store the resource credential in their respective secure containers in non-volatile memory, thereby providing application-level encryption of the resource credential. This application-level encryption ensures that the resource credential for a particular application can only be accessed while the application is running in memory and in an unlocked state. In some embodiments, an additional level of security may be desirable to prevent exposure of the resource credential in the event that the application-level security is compromised. To achieve this additional layer of security, the first and second applications 200-1, 200-2 may be configured to encrypt the locally cached resource credential using a cryptographic key (hereinafter termed a "credential key") based on, for example, a symmetric encryption scheme according to the Advanced Encryption Standard (AES). In such embodiments, the credential key is distributed by the registry service 136 to the first and second applications 200-1, 200-2, where it is stored in memory associated with the respective applications 200-1, 200-2. For example, the credential key may be distributed to a given application 200-1, 200-2 during an authentication session between the respective application 200-1, 200-2 and the registry server 134. In some examples, the applications 200-1, 200-2 may store the credential key in volatile memory such that credential key is automatically "purged" once the application has been closed or terminated, thereby mitigating the risk of the credential key being accessed by a malicious party. In these embodiments, each application 200-1, 200-2 uses the same credential key to encrypt and decrypt the locally cached resource credentials, thereby enabling the resource credential to be passed between the applications 200-1, 200-2 in encrypted form, thereby providing an additional layer of protection for the resource credential whilst it is "in transit" between applications 200-1, 200-2 and between devices 110-1, 110-2.

Figure 9:
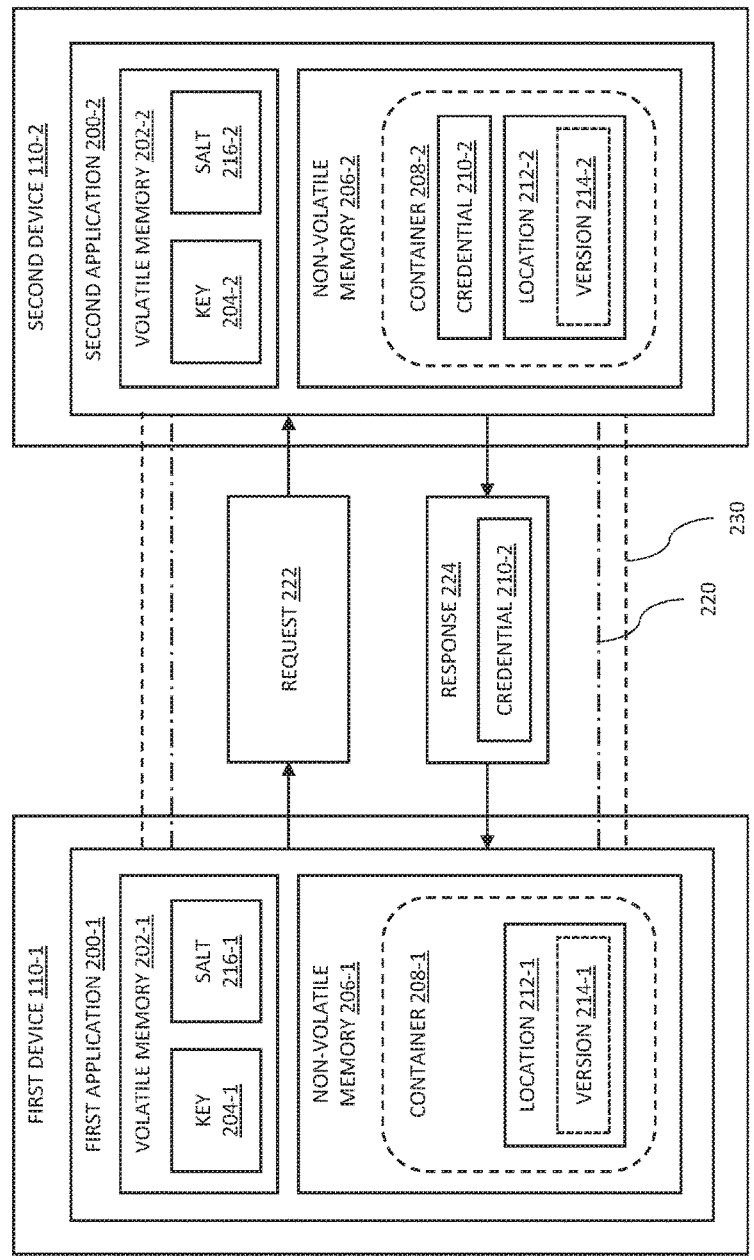
FIG. 9 is a schematic diagram showing a first application and a second application running on a first computing device and a second computing device respectively, in accordance with an embodiment.

FIG. 9 is a schematic diagram showing aspects of the first application 200-1, installed on figure computing device 110-1 and the second application 200-2 installed on second computing device 110-1 of FIG. 8. The first and second applications 200-1, 200-2 are configured to establish a secure communications channel between the first computing device 110-1 and the second computing device 110-2 for the exchange of application data and/or sharing of application services. According to the example shown in FIG. 9, the first application 200-1 and the second application 200-2 are associated with respective storage areas in the form of volatile memory 202-1, 202-2 (e.g. Random Access Memory (RAM)) and non-volatile memory 206-1, 206-2 (e.g. a magnetic disk or a solid state storage device). The first application 200-1 and the second application 200-2 each store a credential key 204-1, 204-2 in their respective areas of volatile memory 202-1, 202-2. Similarly, the first application 200-1 and the second application 200-2 also store respective credential location records 212-1, 212-2 in respective secure containers 208-1, 208-2, located in non-volatile memory 206-1, 206-2. As discussed above with reference to FIG. 8, the local location records 212-1, 212-2 indicate which applications on which computing devices associated with the user or entity store a cached copy of the resource credential, based on notifications received from the registry service 136. According to some embodiments, the local location records 212-1, 212-2 may also include corresponding version information 214-1, 214-2, which provides a relative indication of the age of the location record 212-1, 212-2. The version information 214-1, 214-2 may, for example, be a version number assigned to the respective location record 212-1, 212-2 by the registry service 136, or a version time indicating a time at which the respective location record was generated or updated by the registry service 136.

With reference to the example shown in FIG. 9, the second application 200-2 stores a resource credential 210-2 for the resource 122, which has been encrypted using credential key 204-2, in its respective secure container 208-2. In contrast, the first application 200-1 does not initially store or cache a copy of the user's resource credential for the resource 122. As discussed above with reference to FIG. 8, the first application 200-1 and the second application 200-2 are configured to initiate an inter-application communications session using a services discovery protocol, and to exchange application data using an inter-application communication protocol 220. For example, the first and second applications 200-1, 200-2 may exchange application data using an inter-application communication protocol 220 carried over the direct device-to-device communications channel 230. Accordingly, when the first application 200-1 requires access to the resource 122, it accesses its respective location record 212-1 to determine which of the plurality of applications 200 has a locally cached copy of the resource credential. In this case, the location record 212-1 indicates that the second application 200-2 running on the second computing device 110-2 has a cached copy of the resource credential for the resource 122. On this basis, the first application 200-1 proceeds to locate the second application 200-2 using the services discover protocol, and sends a request for the resource credential 210-2 to the second application 200-2 using the inter-application communication protocol 220, in the form of request message 222. Upon receipt of the request message 222, the second application 200-2 retrieves the encrypted resource credential 210-2 from its respective secure container 208-2 and returns the encrypted resource credential 210-2 to the first application 200-1 using the inter-application communication protocol 220, in the form of a response message 224. Upon receipt of the response message 224, the first application 200-1 stores the encrypted resource credential 210-2 in its respective secure container 208-1, decrypts the encrypted resource credential 210-2 using credential key 204-1, and accesses the resource 122 using the decrypted resource credential.

In some situations, the first application 200-1 may not be able to contact the second application 200-2 to obtain a copy of the resource credential 210-2 (e.g. the second computing device 110-2 is out of range of the first computing device 110-1). In this situation, the first application 200-1 will prompt the user of the first computing device 110-1 to input the resource credential (i.e. resource credential) and, upon successful authentication by the resource 122, inform the registry service 136 that is now has a cached copy of the resource credential available for other applications 200. As a result, the location record stored by the registry service 136 may indicate that the validated resource credential cached by the first application 200-1 is more recent than validated resource credential cached by the second application 200-2. In some circumstances, this has the potential to cause the second application 200-2 to send a request for the resource credential to the first application 200-1, despite itself having a cached copy of the validated resource credential, which in turn may lead to a compromised user experience. To address this problem, the first and second applications 200-1, 200-2 may report a hash of the respectively cached resource credentials to the registry service 136, thereby enabling the registry service 136 to compare the hash values and determined whether the cached resource credentials are the same. To facilitate this mechanism, the registry service 136 may distribute a salt value 216-1, 216-2 to the first and second application 200-1, 200-2 for use in generating the hash of the cached resource credentials, thereby ensuring that the resulting hash values are secure. According some embodiments, the salt value may be generated by the application which generates the corresponding credential key or, alternatively, generated by the registry service 136 itself.

Figure 10:
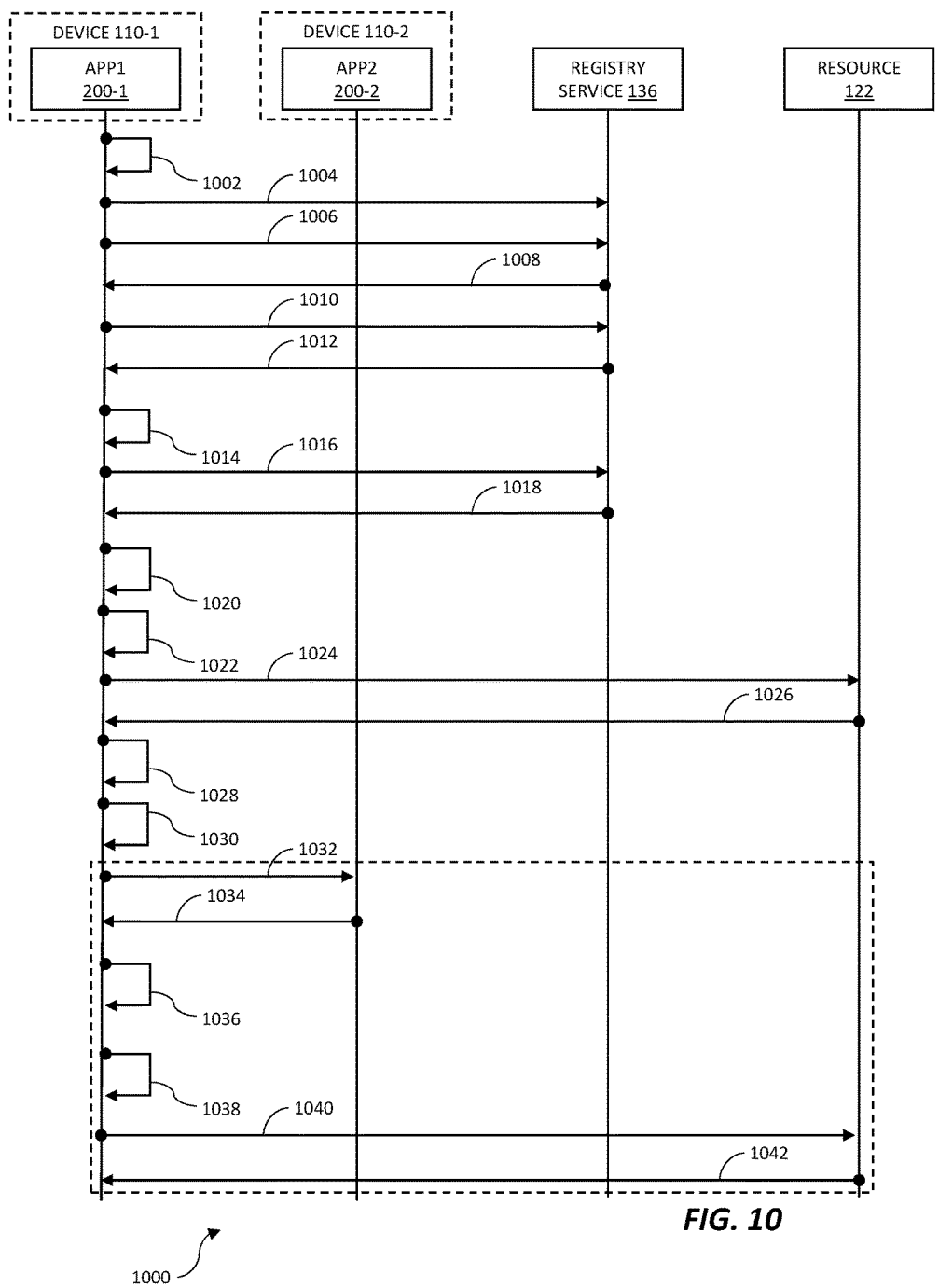
FIG. 10 is a signaling diagram showing a method of accessing a resource in accordance with an embodiment.

FIG. 10 is a signaling diagram showing the steps involved in accessing the resource 122 from the first and second applications 200-1, 200-2 of FIGS. 8 and 9, in accordance with an embodiment. In a first step, the first application 200-1 connects to the NOC 150 and authenticates itself in the usual manner to gain access to the enterprise network 130 [step 1002]. Once authenticated, the first application 200-1 sends a subscription request to the registry service 136 hosted on the registry server 134 to subscribe to updates to the location record held by the registry server 134 for the user of the first and second computing devices 110-1, 110-2 [step 1004]. Thereafter, the first application 200-1 may send a request for the current version (i.e. most up-to-date version) of the location record to the registry service 136 [step 1006], in response to which the registry service 136 returns the version information corresponding to the location record [step 1008]. Next, the first application 200-1 requests the user's credential key and salt value for the resource 122 from the registry service 136 [step 1010] and the registry service 136 responds by sending the user's current credential key and salt value for the resource 122 to the first application 200-1 [step 1012]. It will be appreciated that in some embodiments the requests from the first application 200-1 to the registry service 136 at steps 1004, 1006 & 1010 may be pipelined into a single request, as may the associated responses from the registry service 136 to the first application 200-1 at steps 1008 & 1012. Similarly, the skilled person will also appreciate that, while steps 1006 and 1008 occur after step 1004, they can occur at a point in time other than, for example, in response to execution of step 1004.

Next, the first application 200-1 determines whether the associated location record 212-1 stored locally by the first application 200-1 is the current version, based on the version information provided by the registry service 136 at step 1008 [step 1014]. If the stored location record 212-1 is not the current version, the first application 200-1 sends a request for the current version of the location record to the registry service 136 [step 1016]. The registry service 136 responds by sending the current version of the credential location record to the first application 200-1 [step 1018] and the first application 200-1 stores the credential location record in its secure container 208-1 [step 1020]. Subsequently, first application 200-1 may receive a request to access the resource 122 hosted by the application server 120 [step 1022]. For example, the first application 200-1 may receive the request via a user interface associated with the first application 200-1. In response to the request to access the resource 122, the first application 200-1 sends a request to the resource 122 [step 1024]. In this example, access to the resource 122 is restricted by the application server 120, which responds to the request at step 1024 by returning an authentication request to the first application 200-1 [step 1026]. In response to the authentication request, the first application 200-1 accesses the locally stored location record 212-1 and determines which applications associated with the user stores a cached copy of the resource credential associated with the resource [step 1028]. In the present example, the location record 212-1 indicates that the second application 200-2 running on the second computing device 110-2 stores a cached copy of the resource credential, and the first application 200-1 proceeds to determine, using the service discovery protocol, whether the second application 200-2 running on the second computing device 110-2 is available (i.e. powered on and within range) to share the resource credential for the resource 122 [step 1030]. If the first application 200-1 determines that the second application 200-2 is available at step 1030, it proceeds to send a request message 222 identifying the resource 122 to the second application 200-2 using the inter-application communication protocol 220 [step 1032]. The second application 200-2 responds by returning the encrypted resource credential 210-2 to the first application 200-1 in a response message 224, which is delivered using the inter-application communication protocol 220 [step 1034]. Upon receipt of the response message 224, the first application 200-1 extracts the encrypted credential 210-2 and stores the encrypted credential 210-2 in the respective secure container 208-1 [step 1036]. Next, the first application 200-1 decrypts the encrypted credential 210-2 using credential key 204-1 received at step 1012 [step 1038] and proceeds to respond to the authentication request received at step 1026 by sending the resource credential to the resource 122 [step 1040]. Upon receipt of the resource credential, the application server 120 validates the credential in the normal manner and notifies the first application 200-1 that access to the resource 122 has been granted [step 1042].

It will be appreciated that steps 1032 to 1042 of method 1000 are conditional on a determination at step 1030 that the second application 200-2 is accessible from the first application 200-1 (i.e. the second computing device 110-2 is powered on and within range of the first computing device 110-1). If, at step 1030, the first application 200-1 determines that it cannot retrieve the credential key from the second application 200-2 or indeed any other application 200, the first application 200-1 proceeds to prompt the user for the credential key and access the resource 122. As a result of this, both the first and second applications 200-1, 200-2 may independently cache encrypted copies of the same credential key which necessitates a number of measures to ensure that the location record managed by the registry service 136 and persisted by the applications 200 provides an accurate record of which applications 200 cache a valid credential key.

Figure 11:
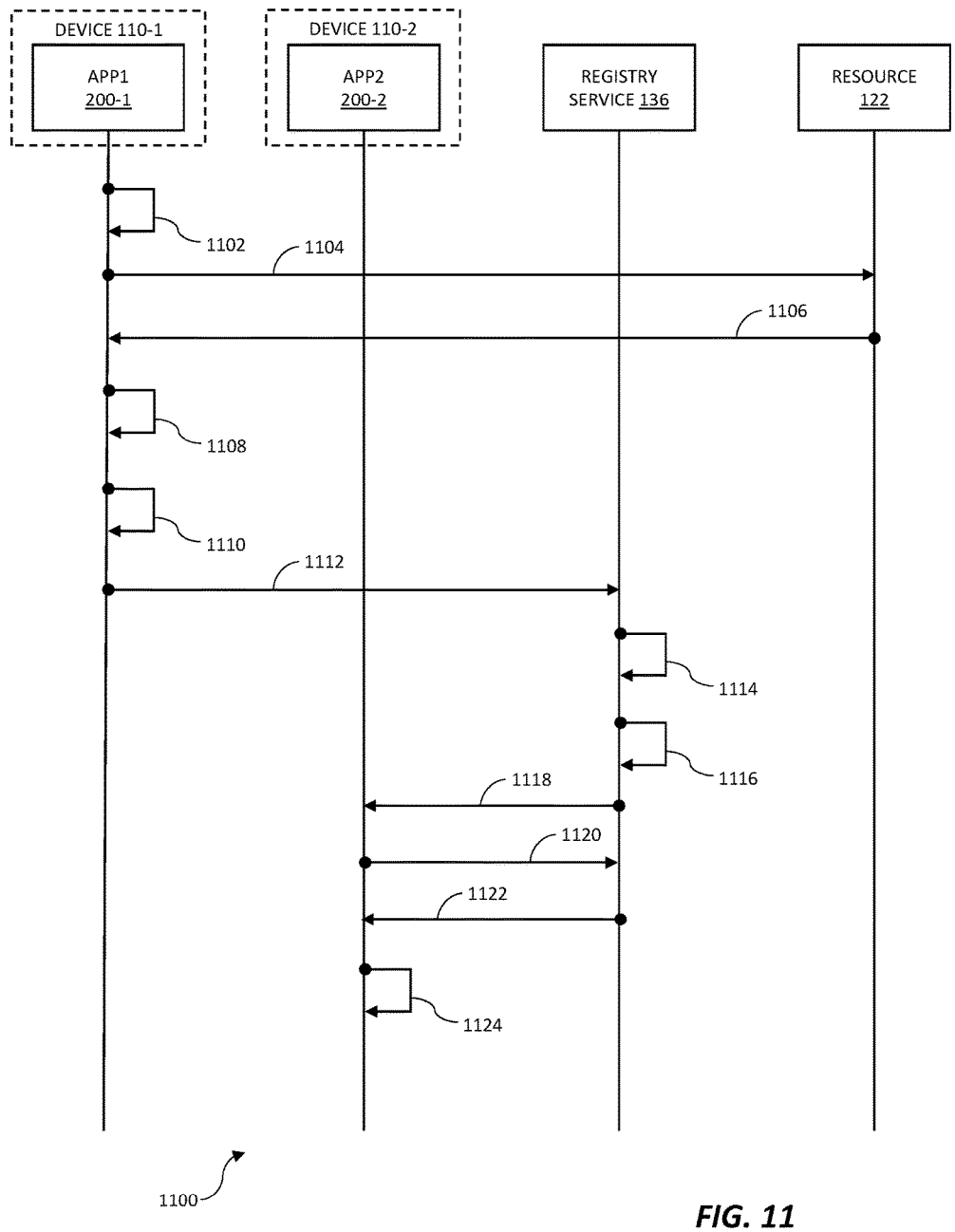
FIG. 11 is a signaling diagram showing a method of updating a resource credential in accordance with an embodiment.

FIG. 11 is a signaling diagram showing a method 1100 of updating the location records persisted at the plurality of applications 200 in accordance with an embodiment. According to this embodiment, the first application 200-1 does not initially store a locally cached copy of the resource credential (or alternatively stores an invalid or old credential for the resource 122) and does not have access to a cached copy of the resource credential stored by a different application. In this example, the locally cached location record 208-1 for the resource 122 indicates that that resource credential is stored by the second application 200-2 installed on the second computing device 200-2 but the first application 200-1 is unable to contact the second application 200-2 to retrieve the encrypted resource credential (e.g. the second computing device 110-2 is powered down and/or out of range of the first computing device 110-1).

According to this example, the first application 200-1 prompts the user for the resource credential and receives the resource credential via a user interface [step 1102]. Next, the first application 200-1 requests access to the resource 122 and provides the resource credential for authentication [step 1104]. The application server 120 checks the resource credential provided by the first application 200-1 and, if valid, responds appropriately to the first application 200-1 [step 1106]. Upon successfully accessing the resource 122, the first application 200-1 encrypts the resource credential using its locally cached credential key 204-1 [step 1108], and stores the encrypted resource credential in its secure container 208-1 [step 1110]. Next, the first application 200-1 sends a message to the registry service 136 to notify the registry service that it the first application 200-1 is now in possession of a valid resource credential [step 1112]. In this example, the message includes the data identifying the resource (e.g. domain and realm for the resource), the data identifying the first application 200-1, the date and time at which the credential was validated (e.g. a timestamp) and hash of the resource credential salted using the salt value 216-1 stored by the first application 200-1. Upon receipt of the message from the first application 200-1 at step 1112, the registry service 136 first determines whether the resource credential validated by the first application 200-1 is the same as the resource credential cached by the second application 200-2 which the first application 200-1 was unable to retrieve owing to lack of connectivity. The registry service 136 performs this check by comparing the hash of the resource credential received from the first application 200-1 with the hash of the resource credential cached received previously from the second application 200-2 [step 1114]. If the hash values match, the registry service 136 updates its location record to indicate that the first application 200-1 now stores a validated resource credential for the resource 122 and no further action is required. However, if the hash values do not match, this indicates that the resource credential cached by the second application 200-2 is now invalid (i.e. superseded by the credential key validated by the first application 200-1) and the registry service proceeds to update its location record accordingly [step 1116]. Next, the registry service 136 sends a notification to all applications 200 associated with the user which have subscribed to receive location record updates for the resource 122, which in this case includes the second application 200-2 which is now known to be caching an invalid resource credential [step 1118]. Upon receipt of the notification, the second application 200-2 requests the updated location record for the resource 122 from the registry service 136 [step 1120], causing the registry service 136 to respond by sending the updated location record to the second application 200-2 [step 1122]. Finally, the second application 200-2 stores the updated location record in its secure container 208-2 [step 1124].

The method of FIG. 11 may also find application in systems where the first application 200-1 and the second application 200-2 are not configured to establish a device-to-device communications channel by design. In such systems, the method of FIG. 11 provides a mechanism for the registry service 136 to determine when the resource credential cached by one or more of the applications 200 has been become invalid (i.e. superseded by a newer resource credential cached by a different application) and thus notify those applications accordingly. This enables the notified applications to prompt the user for input of the new resource credential prior to attempting to access the resource 122, thereby avoiding presenting the resource with a known-to-be invalid resource credential. Such measures may be beneficial, for example, when the access control mechanism employed by the application server 120 hosting the resource 122 enforces a limit on the number of invalid login attempts allowed for the user.

According to some alternative embodiments, the applications 200 of FIGS. 1 to 11 are configured to locally store or cache the credential key instead of the encrypted resource credential, such that the credential key can be made available to other applications in the plurality of applications 200 upon request using, for example, the inter-application communication protocol discussed above. To facilitate sharing of the credential key between the applications 200, the registry server 134 provides a registry service 136, to which the applications send notifications regarding the status of their cached copies of the credential key. In turn, the registry service 136 is configured to maintain a record indicating which applications in the plurality of applications 200 store a cached copy of the credential key, based on the notifications received from the plurality of applications 200. In such alternative embodiments, the registry service 136 stores and distributes the encrypted resource credential to the applications 200, where it is stored in memory associated with the respective applications 200. According to these embodiments, each application 200 decrypts the encrypted resource credential received from the registry server 136 using the credential key communicated or shared amongst the plurality of applications 200. Thus, according to these alternative embodiments, instead of sharing copies of the encrypted resource credentials, the applications 200 share copies of the credential key, thereby potentially reducing the number of sharing operations between the application and simplifying communications between the applications 200 and the registry service 136. According to these alternative embodiments, a situation may arise where the second application 200-2 running on the second computing device 110-2 registers an encrypted credential with the registry service 136, and later the first application 200-1 running on the first computing device 110-2 attempts to retrieve a copy of the encrypted resource credential from the registry service 136 when it has never before been in range of the first device and thus does not have a copy of the credential key needed to decrypt the encrypted resource credential. In this situation, the first application 200-1 will have to generate a new credential key, prompt the user for the resource credential, and store a new copy of the resource credential, encrypted with the new credential key, at the registry service 136. The result of this process is that the registry service 136 will store separate copies of the same resource credential, encrypted using the different respective credential keys for the first and second applications 200-1, 200-2.

Figure 12:
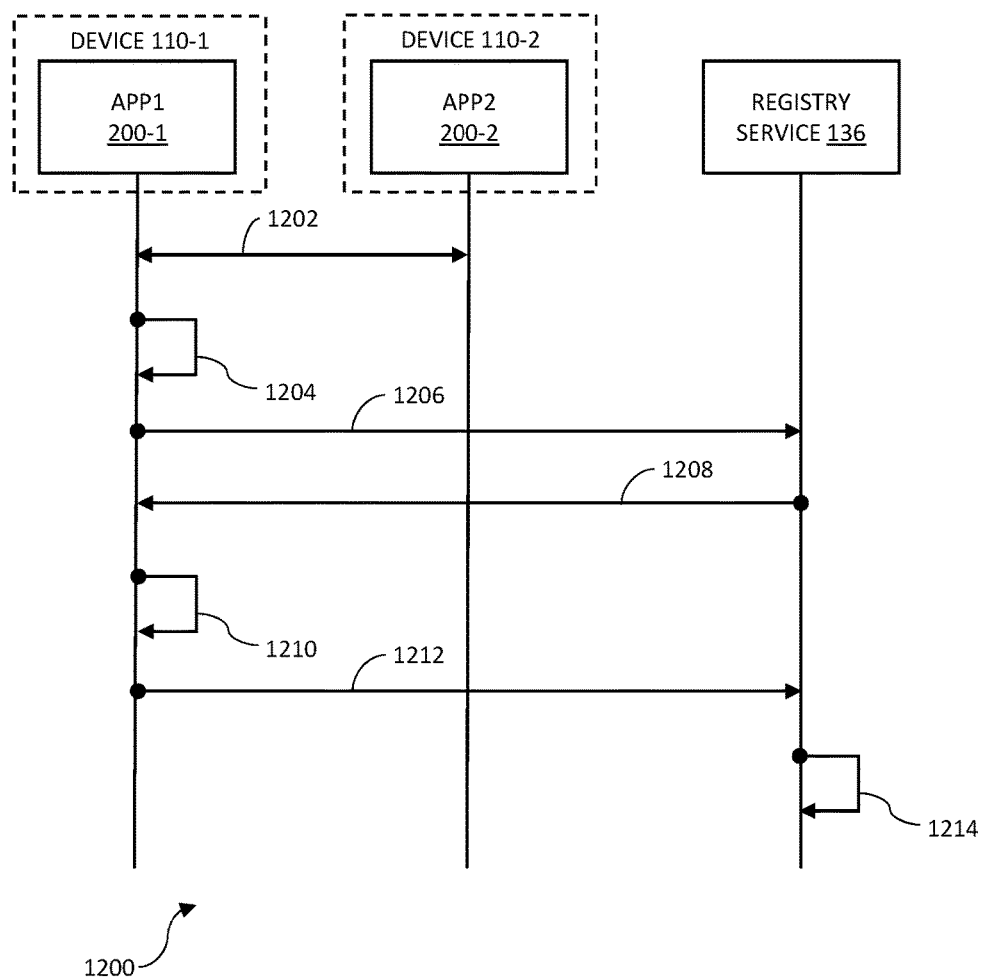
FIG. 12 is a signaling diagram showing a method of updating a credential key in accordance with an embodiment.

FIG. 12 is a signaling diagram showing a method 1200 of consolidating encrypted resource credentials at the registry service 136 to address the case where the first and second applications 200-1, 200-2 have provided separate copies of the resource credential encrypted with different respective credential keys to the registry service 136, as discussed above. According to this method, once the first and second computing devices 110-1, 110-2 are within range and the first and second applications 200-1, 200-2 have performed an appropriate service discovery process, the first and second applications 200-1, 200-2 perform a negotiation process to agree a single shared resource key [step 1202]. In this example, the first application 200-1 agrees to use the credential key 204-2 associated with the second application 200-2 and stores the agreed credential key in its secure container 208-1 [1204]. Next, the first application 200-1 sends a request to the registry service 136 for all encrypted resource credentials which were encrypted using the old credential key [step 1206] and the registry service 136 responds with the requested encrypted credentials [step 1208]. The first application 200-1 proceeds to decrypt the encrypted resource credentials received from the registry service 136 using the old credential key, and re-encrypt the decrypted resource credentials using the new resource credential agreed with the second application 200-2 [step 1210]. Next, the first application 200-1 sends the re-encrypted resource credentials to the registry service 136 [step 1212] and the registry service updates the location record as required [step 1214].

The method 1200 of FIG. 12 is also applicable to consolidation of encrypted resource credentials at the registry service 136 for applications 200 on more than two computing devices 110. In such embodiments, various techniques may be employed to avoid repeated negotiations between the applications 200 and ensure that the applications 200 converge on a single shared credential key. For example, a global ordering of credential keys may be specified and the applications 200 may be configured to select the credential key with the lowest or highest ordered key during the negotiation process. Alternatively, each application 200 may register a hash of the respectively cached credential key at the registry service 136, and the applications 200 may be configured to select the credential key used by the most applications during the negotiation (e.g. based on a notification from the registry service 136). This latter technique is also advantageous in that is minimizes the number of resource keys requiring re-encryption in step 1210 of FIG. 12.

According to some exemplary embodiments, the first application 200-1 and the second application 200-2 may be installed on different respective computing devices, wherein one of the respective computing devices provides a secure environment for storage of the encrypted credential, relative to the environment provided by the other computing device. In this context, the "secure environment" may refer, for example, to an operating system providing additional functionality for protection of application data, such as additional encryption and/or sandboxing of application data. According to such embodiments, the application installed on the computing device providing the secure environment may be configured to function as a primary application for purposes of storing the credential key. Similarly, the application running on the computing device providing the relatively less secure environment may be configured to purge, bit-wipe, or delete copies of the credential key after use to mitigate against attack from a malicious party of entity. In this manner, storage of the credential key is effectively delegated to the application running on the computing device which provides the relatively more secure environment for storage of the credential key. Examples of relatively secure environments in this context, are those provided by the Samsung™ KNOX™ and BlackBerry™ Balance™ enterprise mobile security solutions, which provide operating level separation of personal and business data.

According to some embodiments, the first application 200-1 and the second application 200-2 may be separate instances of the same application, running on the first computing device 110-1 and the second computing device 110-2 respectively. For example, the first application 200-1 may be an instance of a productivity application running on a smartphone and the second application 200-2 may be an instance of the productivity application running on a tablet or similar.

Further, according to some embodiments, the plurality of applications 200 configured to share the resource credential may include a first subset of applications on the first computing device 110-1 and a second subset of applications on the second computing device 110-2. Thus, any particular application (e.g. the first application 200-1) in the plurality of applications 200 may seek to obtain a validated resource credential from a different application on the same computing device (e.g. the first computing device 110-1) or from a different application on a different computing device (e.g. the second computing device 110-2). According to some embodiments, the given application may be configured to seek to obtain a validated resource credential from a different application on the same computing device in preference to a different application on a different computing device. This ensures that device-to-device communication is only initiated when necessary (i.e. when none of the applications on the same computing device are in possession of a validated resource credential).

It will be appreciated that at least parts of the methods discussed above with reference to FIGS. 1 to 12 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Typically, the computing device takes the form of a portable computing device or a non-portable computing device, such as a desktop computer. An example of a portable computing device 1300 according to an embodiment is shown schematically in FIG. 13. The portable computing device 1300 may, for example, take the form of a smart phone, a personal digital assistance (PDA), a tablet computer or a notebook computer, etc. The portable computing device 1300 includes a screen 1302, which may be a touch screen for receipt of input from a user. Alternatively or additionally, the portable computing device 1300 may include a physical keyboard (not shown), which may be integral to the portable computing device 1300 or connected wirelessly or by wired connection to the portable computing device 1300. The computing device further includes a processor 1304, a non-volatile storage device 1306 (such as a hard disk drive or a solid-state drive) and a random access memory (RAM) 1308. The processor executes instructions stored in the random access memory 1308 that have been loaded from the non-volatile storage device 1306. These instructions are in the form of one or more programs that implement an operating system (not shown) and first and second applications according to the embodiments described above with reference to FIGS. 1 to 12. The random access memory 1308 is also used by programs running on the processor 1304 as a means of storing and accessing data in the form of electronic signals where the data is used during the execution of the programs. The operating system provides a file system for storing, modifying and accessing files held in the non-volatile storage device 1306. The file system may be accessible to other programs running on the processor 1304 via the operating system. Programs running on the processor 1304 also process user input obtained via the screen 1302 or keyboard (not shown), etc.

The portable computing device 1300 also includes a network interface 1314 (or a plurality of network interfaces) which allows programs running on the processor 804 to transmit and receive data to and from other devices and/or servers via a communications, using wired and/or wireless connections. Typically, the network interface 1314 is implemented in a combination of software and hardware (e.g. a network interface controller) to provide the necessary network connectivity to the programs running on the processor 1304. Examples of network interface 1314 include a Wi-Fi™ interface and/or a cellular radio utilizing standards such as GSM, UMTS and/or LTE.

In some embodiments, the portable computing device 1300 also includes a local communication interface 1316 (or a plurality of local communication interfaces) for establishing direct device-to-device communication channels with other computing devices in the vicinity of portable computing device 1300. Examples of local communication interfaces include Bluetooth™, IrDA™ and NFC, etc.

Figure 13:
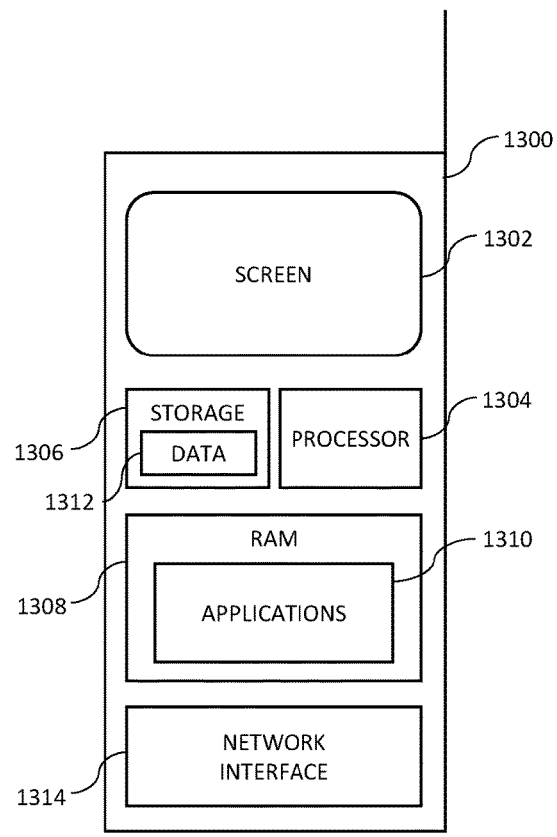
FIG. 13 is a schematic diagram showing a computing device in accordance with an embodiment.
Figure 14:
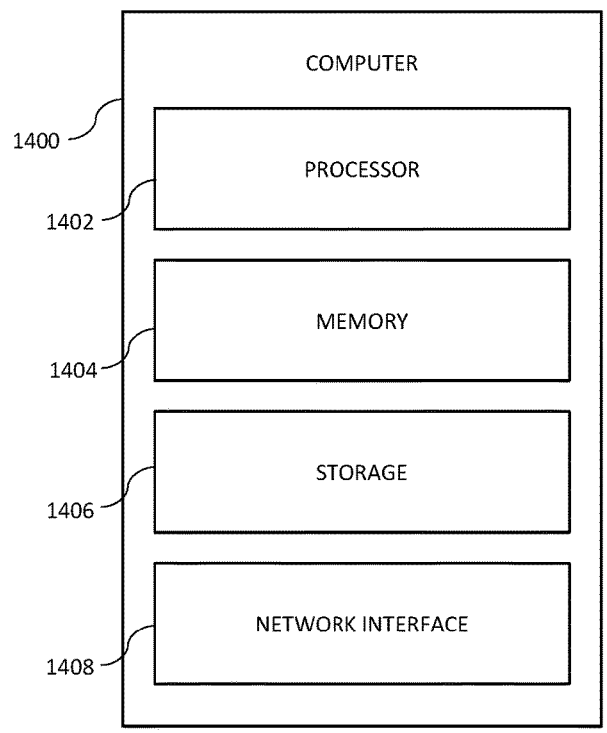
FIG. 14 is a schematic diagram showing a registry server in accordance with an embodiment.

The registry server 134 described above with reference to FIGS. 1 to 12 are typically embodied by a computer that executes computer readable instructions. FIG. 13 depicts schematically an example of a suitable computer 1300, including a processor 1302, a memory 1304, a storage device 1306 and a network interface 1308. The processor 1302 may include a multifunction processor and/or an application-specific processor, examples of which include the PowerPC™ family of processors by IBM™ and the x86 and x86-64 family of processors by Intel™. The memory 1304 within the computer is typically RAM and storage device 1306 is typically a large capacity permanent storage device such as a magnetic hard disk drive or solid state memory device. The network interface 1308 enables communications with other computers in a network using as suitable protocol, such as the Internet Protocol (IP) and the processor 1302 executes computer readable instructions stored in storage 1306 to implement embodiments of the invention as described hereinbefore.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
   storing, in a first storage area associated with a first application of a plurality of applications, a first credential for use in accessing a resource, wherein the first credential is received via a user interface in response to a prompt generated by the first application that prompts a user to input the first credential for use in accessing the resource;
   receiving, at a second application of the plurality of applications, a message comprising data for use in determining that the first application stores a validated credential for accessing the resource, wherein the message received at the second application is received from a server system, remote from the plurality of applications, which maintains data indicating a subset of the plurality of applications which store respective validated credentials for accessing the resource;
   sending a request for the validated credential from the second application to the first application based on the message;
   receiving the first credential at the second application from the first application in response to the request sent from the second application to the first application, wherein the second application is refrained from prompting the user to input the first credential for use in accessing the resource;
   storing the first credential in a second storage area associated with the second application; and
   sending a notification to the server system, remote from the plurality of applications, indicating that the second storage area associated with the second application stores a copy of the first credential.

2. The method of claim 1, wherein the request for the validated credential is sent from the second application to the first application in response to a request to access the resource received at the second application.

3. The method of claim 1, wherein the second application stores a second credential and the request for the validated credential is sent from the second application to the first application in response to determining that the second credential is invalid in respect of the resource.

4. The method of claim 1, further comprising accessing the resource by the second application using the first credential received from the first application.

5. The method of claim 1, wherein the first credential comprises an encrypted secret for accessing the resource.

6. The method of claim 5, further comprising decrypting the encrypted secret at the second application using a cryptographic key, wherein the cryptographic key is received at the second application from the server system.

7. The method of claim 6, wherein the cryptographic key is stored in volatile memory associated with the second application.

8. The method of claim 6, wherein the cryptographic key is received at the second application from the server system as part of an authentication session between the second application and the server system.

9. The method of claim 1, wherein the resource is located at a resource server remote from the plurality of applications.

10. The method of claim 1, wherein the message received at the second application is received as part of a synchronization session between the second application and the server system.

11. The method of claim 1, wherein the data received at the second application comprises a first timestamp which indicates a time at which the first credential was verified as providing access to the resource by the second application.

12. The method of claim 11, wherein the second application stores a second credential and a second timestamp indicating a time at which the second credential was verified as providing access to the resource by the second application.

13. The method of claim 12, wherein the request for a validated credential is sent from the second application to the first application in response to determining that the time indicated by the first timestamp is later than the time indicated by the second timestamp.

14. A method comprising:
storing, at a server system remote from a plurality of applications, data indicating a subset of the plurality of applications which store respective validated credentials for accessing a resource;
receiving, at the server system remote from the plurality of applications, a notification from a first application in the plurality of applications, wherein the notification indicates that the first application has successfully accessed the resource using a first credential stored in working memory associated with the first application, wherein the first credential is received via a user interface in response to a prompt generated by the first application that prompts a user to input the first credential for use in accessing the resource;
updating the data based on the notification received from the first application to indicate that the working memory associated with the first application stores a validated credential for the resource;
sending, from the server system to a second application in the plurality of applications, data for use in determining that the first application stores a validated credential for the resource, wherein the second application is refrained from prompting the user to input the first credential for use in accessing the resource;
receiving, a second notification from the second application indicating that the second application stores a copy of the first credential; and
updating the data based on the second notification received from the second application to indicate that the second application stores a copy of the validated credential for the resource.

15. The method of claim 14, wherein the notification received at the server system from the first application comprises data indicative of the first credential.

16. The method of claim 15, wherein the data indicative of the first credential is a hash of the first credential, the hash of the first credential being generated by the first application.

17. The method of claim 15, wherein the data indicating the subset of the plurality of applications which store respective validated credentials for accessing the resource includes data indicative of a second credential stored by the second application, and the method further comprises:
determining, at the server system, whether the first credential is different from the second credential, based on a comparison of the data indicative of the first credential and the data indicative of the second credential; and
sending, from the server system to the second application in the plurality of applications, data indicating that the second credential stored by the second application is invalid, when it is determined that the first credential is different from the second credential.

18. The method of claim 1, wherein the first application is configured on a first computing device and the second application is configured on a second computing device different from the first computing device.

19. A non-transitory computer-readable storage medium comprising computer-executable instructions which, when executed by a processor, cause a computing device to perform a method comprising:
storing, in a first storage area associated with a first application of a plurality of applications, a first credential for accessing a resource, wherein the first credential is received via a user interface in response to a prompt generated by the first application that prompts a user to input the first credential for use in accessing the resource;
receiving, at a second application of the plurality of applications, a message comprising data for use in determining that the first application stores a validated credential for accessing the resource, wherein the message received at the second application is received from a server system remote from the computing device which maintains data indicating a subset of the plurality of applications which store respective validated credentials for accessing the resource;
sending a request for the validated credential from the second application to the first application based on the message;
receiving the first credential at the second application from the first application in response to the request sent from the second application to the first application, wherein the second application is refrained from prompting the user to input the first credential for use in accessing the resource;
storing the first credential in a second storage area associated with the second application; and
sending a notification to the server system, remote from the plurality of applications, indicating that the second storage area associated with the second application stores a copy of the first credential.

* * * * *